US007909112B2

(12) United States Patent
Decker

(10) Patent No.: US 7,909,112 B2
(45) Date of Patent: Mar. 22, 2011

(54) COMPACT MOBILE FIRE ATTACK VEHICLE MOUNTABLE TO AN EMERGENCY VEHICLE

(76) Inventor: Gordon Michael Decker, Roswell, GA (US)

(*) Notice: Subject to any disclaimer, the term of this patent is extended or adjusted under 35 U.S.C. 154(b) by 0 days.

(21) Appl. No.: 12/080,862

(22) Filed: Apr. 7, 2008

(65) Prior Publication Data

US 2008/0271901 A1 Nov. 6, 2008

Related U.S. Application Data

(60) Provisional application No. 60/927,660, filed on May 3, 2007.

(51) Int. Cl.
*A62C 27/00* (2006.01)
*B60P 3/06* (2006.01)
*B62D 53/04* (2006.01)

(52) U.S. Cl. ................ 169/24; 169/70; 169/46; 169/52; 280/402

(58) Field of Classification Search .................... 169/24, 169/44, 46, 53, 52, 67, 14, 30; 280/402, 280/495, 467, 493, 490.1, 511, 512, 180, 280/762–766
See application file for complete search history.

(56) References Cited

U.S. PATENT DOCUMENTS

| | | | | | |
|---|---|---|---|---|---|
| 195,183 | A | * | 9/1877 | Taylor | 169/24 |
| 2,367,032 | A | * | 1/1945 | La Bour | 415/56.1 |
| 3,169,581 | A | * | 2/1965 | Cummins | 169/24 |
| 3,220,482 | A | * | 11/1965 | Eveleth | 169/47 |
| 3,749,175 | A | * | 7/1973 | Bower | 169/52 |
| 3,762,478 | A | * | 10/1973 | Cummins | 169/24 |
| 3,799,379 | A | * | 3/1974 | Grether et al. | 414/467 |
| 4,037,664 | A | * | 7/1977 | Gibson | 169/15 |
| 4,113,272 | A | * | 9/1978 | Sebby | 280/402 |
| 4,266,795 | A | * | 5/1981 | Walker | 280/402 |
| 4,359,127 | A | * | 11/1982 | Arnold | 180/252 |
| 4,593,855 | A | * | 6/1986 | Forsyth | 239/74 |
| 4,811,804 | A | * | 3/1989 | Ewers et al. | 180/53.8 |
| 4,823,895 | A | * | 4/1989 | Kimball | 180/6.48 |
| 4,875,526 | A | * | 10/1989 | Latino et al. | 169/24 |
| 5,113,946 | A | * | 5/1992 | Cooper | 169/24 |
| 5,467,827 | A | * | 11/1995 | McLoughlin | 169/24 |
| 5,476,146 | A | * | 12/1995 | Brown | 169/24 |
| 5,488,995 | A | | 2/1996 | Kuwahara | |

(Continued)

FOREIGN PATENT DOCUMENTS

FR 2616668 A1 * 12/1988

(Continued)

OTHER PUBLICATIONS

International Search Report for WO/2008/136897 A1 PCT/US2008/004591, Aug. 18, 2008, pp. 1-2.

*Primary Examiner* — Len Tran
*Assistant Examiner* — James S Hogan
(74) *Attorney, Agent, or Firm* — Robert Z. Evora

(57) ABSTRACT

A compact mobile fire attack vehicle detachably mounted to an emergency vehicle. The compact mobile fire attack vehicle is intended to be mountable to the rear end of a fire truck. In response to an emergency call, the mobile fire attack vehicle can be quickly disengaged and deployed to the fire. Likewise, after the emergency has been mitigated, the mobile fire attack vehicle can be quickly and conveniently be re-mounted to the fire truck.

19 Claims, 15 Drawing Sheets

U.S. PATENT DOCUMENTS

| | | | | | |
|---|---|---|---|---|---|
| 5,573,066 | A | * | 11/1996 | Vaillancourt et al. | 169/49 |
| 5,573,300 | A | * | 11/1996 | Simmons | 296/193.04 |
| 5,626,194 | A | * | 5/1997 | White | 169/24 |
| 5,641,024 | A | * | 6/1997 | Lopez Alvarez | 169/52 |
| 5,860,479 | A | * | 1/1999 | LaFollette | 169/24 |
| 6,029,750 | A | * | 2/2000 | Carrier | 169/52 |
| 6,120,232 | A | * | 9/2000 | Dubosh et al. | 414/467 |
| 6,142,238 | A | * | 11/2000 | Holt et al. | 169/47 |
| 6,289,995 | B1 | * | 9/2001 | Fuller | 169/52 |
| 6,340,177 | B1 | * | 1/2002 | Granderson et al. | 280/833 |
| 6,446,731 | B1 | * | 9/2002 | Sorosky | 169/24 |
| 6,457,396 | B1 | * | 10/2002 | Bean et al. | 89/40.04 |
| 6,571,882 | B2 | * | 6/2003 | Yen | 169/24 |
| 7,007,761 | B1 | * | 3/2006 | Johnson, IV | 169/24 |
| 7,300,004 | B2 | * | 11/2007 | Sinden et al. | 239/722 |
| 7,331,586 | B2 | * | 2/2008 | Trinkner et al. | 280/4 |
| 2002/0096339 | A1 | * | 7/2002 | Yen | 169/24 |
| 2004/0089458 | A1 | * | 5/2004 | Jones | 169/24 |
| 2007/0292250 | A1 | * | 12/2007 | Born et al. | 414/467 |
| 2009/0014186 | A1 | * | 1/2009 | Collins | 169/24 |

FOREIGN PATENT DOCUMENTS

| | | | | |
|---|---|---|---|---|
| JP | 04367672 | A | * | 12/1992 |
| JP | 05-024054 | U | | 3/1993 |
| JP | 05024054 | U | * | 3/1993 |
| JP | 13-137377 | A | | 5/2001 |
| WO | WO 2008/136897 | A1 | | 11/2008 |

* cited by examiner

FIG. 15
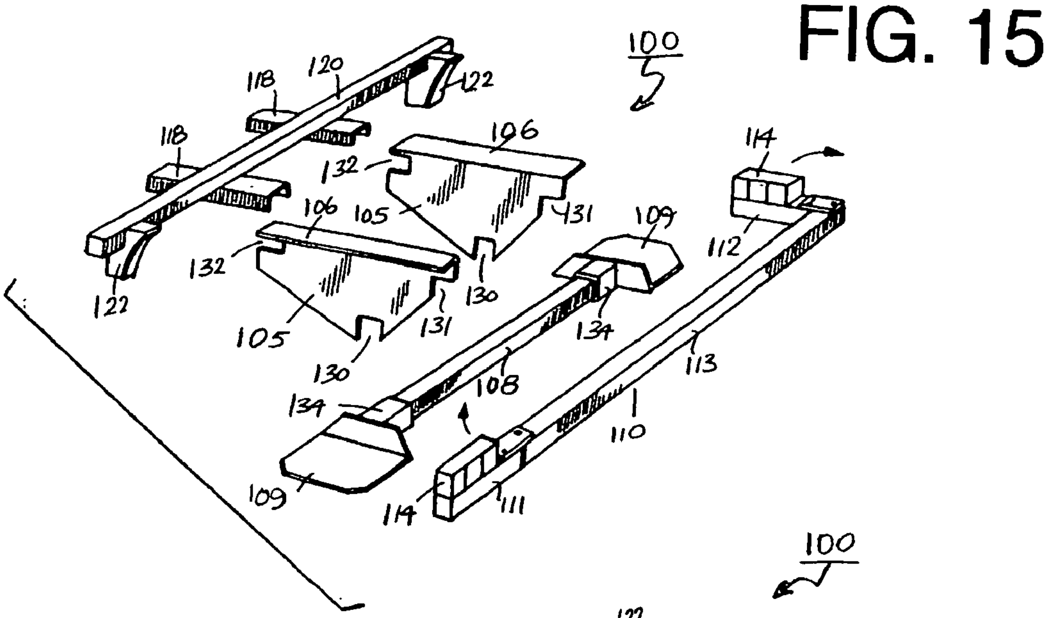
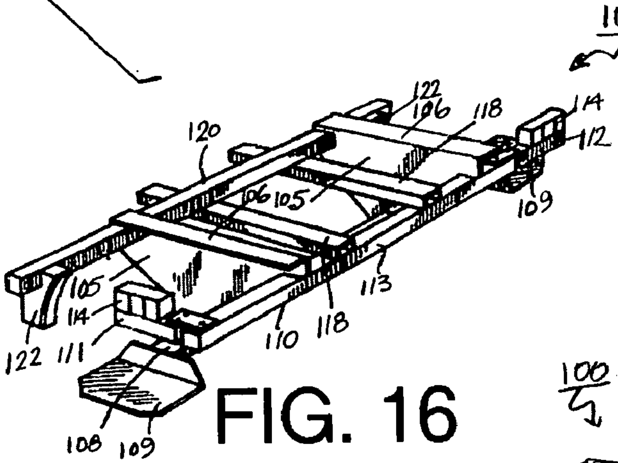
FIG. 16
FIG. 17
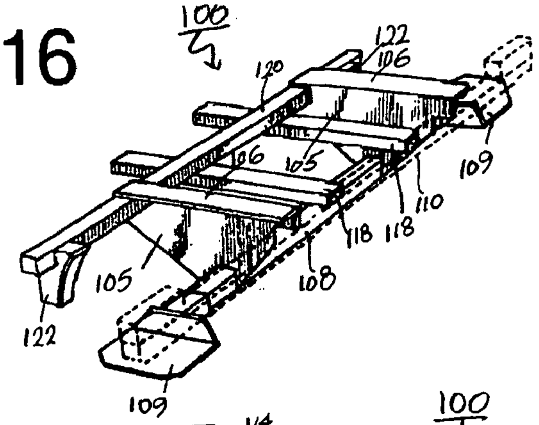
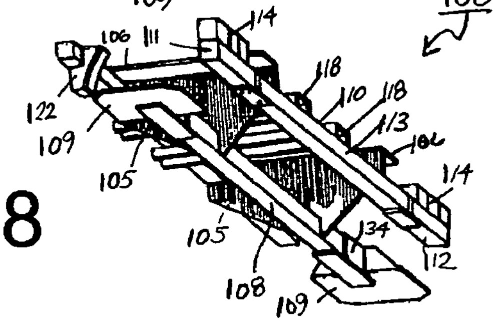
FIG. 18

COMPACT MOBILE FIRE ATTACK VEHICLE MOUNTABLE TO AN EMERGENCY VEHICLE

CROSS REFERENCE TO RELATED APPLICATION

This application is a Non-Provisional which claims the benefit of the filing date of U.S. Provisional Application Ser. No. 60/927,660, entitled "Compact Mobile Fire Attack Vehicle Mounted To An Emergency Vehicle" filed May 3, 2007, the entirety of which is incorporated herein.

BACKGROUND OF THE INVENTION

1. Field of the Invention

The invention relates to compact fire-fighting vehicle mountable to an emergency response fire truck.

2. Description of the Related Art

In response to the burning of a structure located on top of a hill having a driveway with a steep incline, it is oftentimes very difficult for emergency response fire-fighting vehicles (such as firefighting trucks) to drive up close to the fire for a variety of different reasons. Consequently, city and/or county ordinances place restrictions on emergency response vehicles from driving up driveways having a certain grade. In some instance, it is difficult for a fire truck to safely drive up a severe grade for fear that the fire truck may get stuck on the incline attempting to negotiate the steep grade. Likewise, the weight of the fire truck may cause immeasurable damage to the driveway causing unnecessary liability to the fire department.

Various disadvantages are encountered because the fire truck is prohibited from traveling up certain driveways. Some driveways leading up to a structure are long and set quite a distance off of the street. In this instance, when responding to a fire, the fire men and/or women (hereafter referred to as firemen) have to traverse quite a distance up the driveway carrying heavy firefighting equipment to the burning structure. If the driveway is long, this task can be cumbersome and exhaustive and may take the firemen a substantially long time. By the time the firemen arrive at the fire, they are fatigued and in need dire need of recuperation. For example, the typical fire hose carried on a fire truck is heavy and requires at least two firemen to drag the hose from the fire truck to the burning structure. When the distance traveled by the firemen is long, more time and energy is expended setting up to attack the fire that is necessary. In a fire, seconds could mean the difference between a salvage operation or a complete loss of the burning structure.

Accordingly, there is an exigent need for a mobile firefighting vehicle integrated with a fire truck that will allow firefighting personnel to rapidly traverse long driveways with their essential firefighting equipment to a remote burning structure. Another example where a remote fire-fighting vehicle would be instrumental to fighting a fire is the case in which the fire is located at a remote location from the street with no route large enough to support the width or weight of a fire truck, such as a narrow alley-way.

The mobile fire-fighting vehicle must be durable, yet portable enough to be disengagably transported by a fire truck that responds to a fire. This invention addresses this time-consuming need and the shortcomings of the prior art.

SUMMARY OF THE INVENTION

An object of the present invention is to provide a compact and portable independently mobile fire-fighting vehicle that is integrated onto the firefighting truck.

The fire-fighting vehicle has a small and compact construction which can be employed in fighting fires. The firefighting vehicle of this invention is mobile and versatile and intended to operate in a plurality of different environments, including, for example, in a flat or high-rise structure. The mobile fire-fighting vehicle is agile, simple to drive and may be driven through door openings, and can maneuver around narrow curves, and the like. The mobile fire-fighting vehicle may be operated manually or remotely. The mobile fire-fighting vehicle may be equipped with various firefighting equipment and tools.

The mobile fire-fighting vehicle is a small, compact fire-fighting vehicle which may be adapted to and carry one or more firefighting personnel. The compact fire-fighting vehicle may include a connection for indirect and/or may include a direct self contained water supply.

According to this invention, the compact fire-fighting vehicle may be effectively used to allow firefighting personnel to quickly ascend with fire hoses to the immediate vicinity of a burning structure without being exhausted.

The compact fire-fighting vehicle may possess a low-body chassis which may be supported on wheels. The compact fire-fighting vehicle may be powered by a combustion engine, an electric powered motor and/or any type of locomotion. The compact fire-fighting vehicle can be steered directly or by conventional remote control systems. The compact fire-fighting vehicle may have a low center of gravity so that the fire-fighting vehicle can be driven at relatively high speeds.

By means of the invention, a compact, self-propelled miniature fire-fighting vehicle is provided with which it is possible to drive into practically any room, through narrow corridors or alleys and around tight corners, and which can carry a substantial supply of extinguishing material in order to effectively fight small and medium-sized fires.

However, the fire-fighting vehicle according to the invention is also equipped to be able to be employed in combination with large fire-fighting vehicles for fighting large fires, whereby it can be operated by one man. The invention offers a completely new fire-fighting tactic.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein:

FIGS. 15-18 illustrate the various components of the mounting mechanism for mounting the compact fire-fighting vehicle to the fire truck in accordance with this invention.

DETAILED DESCRIPTION OF EXEMPLARY EMBODIMENTS

Particular embodiments of the present invention will now be described in greater detail with reference to the figures.

Various devices and apparatus are known for fighting fires including fire trucks and mobile firefighting vehicles. Of the various devices, some of the mobile firefighting vehicles are large and cumbersome and are pulled atop a trailer and others are intended to be mobile, yet still require a separate vehicle and/or trailer to transport the smaller firefighting vehicle. There is a clear gap between those cumbersome vehicles known in the art and a truly compact mobile firefighting vehicle integrated as part of a conventional fire truck. This invention addresses, and offers a solution to the shortfall evident of the prior art mobile firefighting vehicles.

Figure 1:
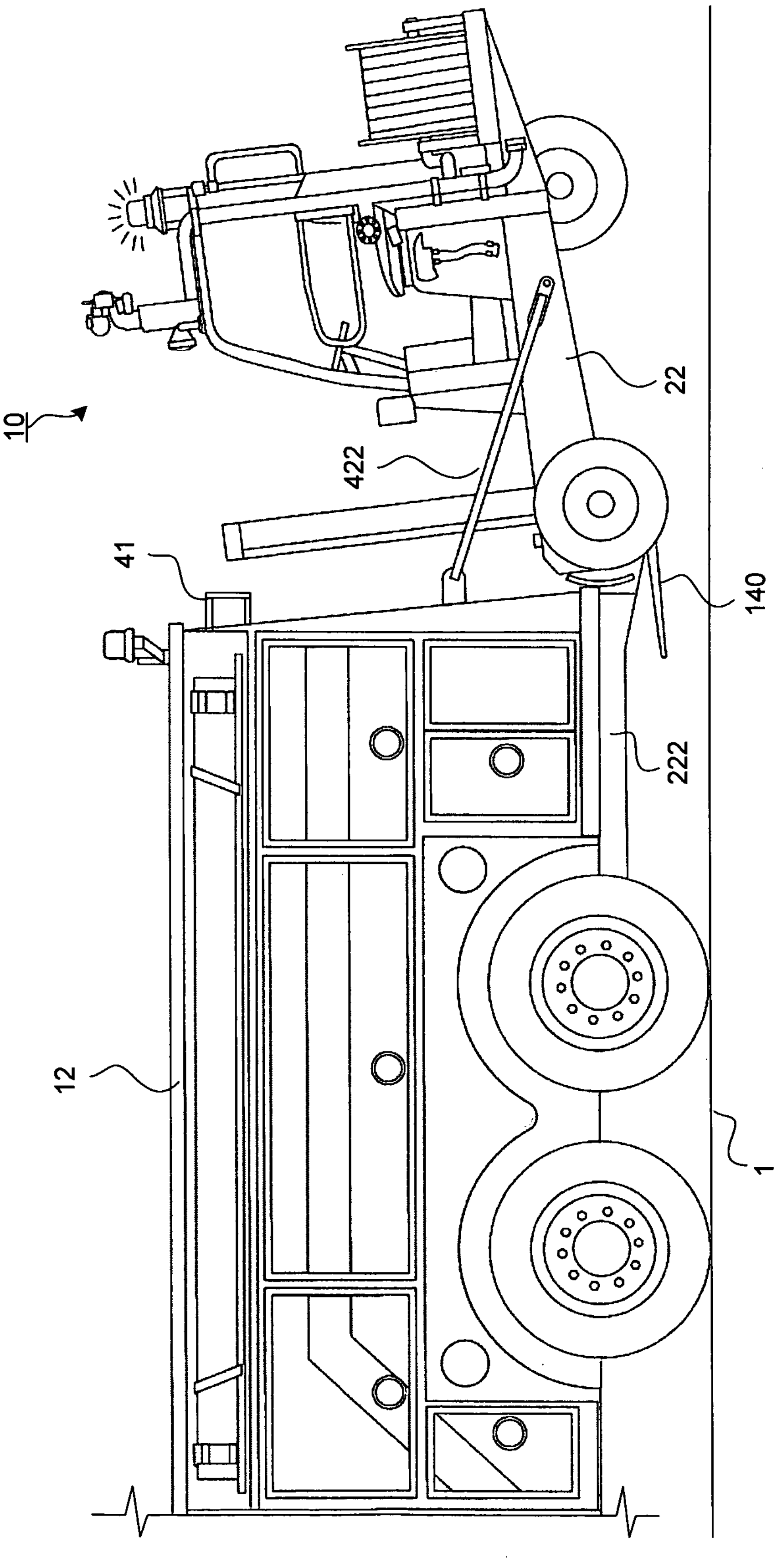
FIG. 1 illustrates an exemplary illustration of a compact and mobile fire-fighting attack vehicle attached to a fire truck in accordance with this invention.

FIG. 1 illustrates a compact mobile fire attack vehicle 10 mounted to a fire truck 12. "Mounting" the mobile fire attack vehicle 10 to the fire truck 12 means that the mobile fire attack vehicle 10 is suspended off of the ground 1 (as shown in FIG. 1) and the weight of the mobile fire attack vehicle 10 is being supported by the chassis 222 and/or suspension of the fire truck 12. The mobile fire attack vehicle 10 is mounted on the fire truck 12 typically when the fire truck 12 is in transit responding to an emergency situation. The mobile fire attack vehicle 10 may be constructed in various sizes and shapes and therefore the suspension and/or chassis 222 of the fire truck 12 must be sturdy enough to hold the weight of the mobile fire attack vehicle 10 as will be described in more detail below. As is also shown, a bracing mechanism 422 is shown to illustrate the additional securing of the mobile fire attack vehicle 10 to the fire truck 12. The compact mobile fire attack vehicle 10 and the various methods for mounting the compact mobile fire attack vehicle 10 to the fire truck 12 will also be described in more detail below.

As shown in FIG. 1, the fire attack vehicle 10 is small and compact in construction and intended to be mountable to the rear end of a fire truck 12. In response to an emergency call, the fire attack vehicle 10 can be quickly disengaged and deployed to the fire. Likewise, after the emergency has been mitigated, the fire attack vehicle 10 can be quickly and conveniently re-mounted to the fire truck 12.

Figure 2:
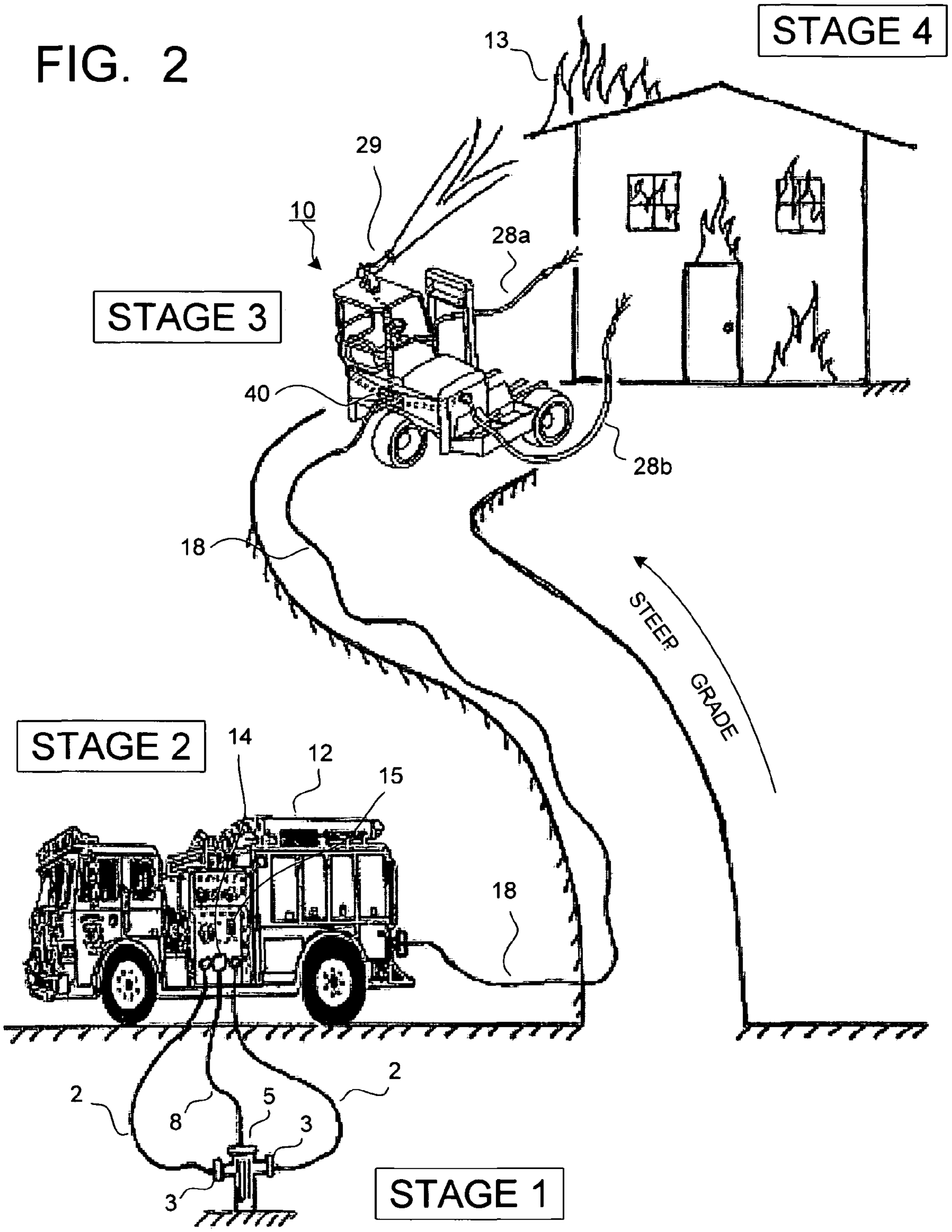
FIG. 2 illustrates an exemplary illustration of various stages in accordance with this invention.

FIG. 2 illustrates an exemplary illustration in which the compact mobile fire attack vehicle 10 may be implemented. For exemplary purposes, various stages are defined to illustrate at least one intended use in which the compact mobile fire attack vehicle 10 may be implemented.

In brief, in a first stage (stage 1), a hydrant 11 is shown attached to provide a source of water to a fire truck 12 located at a second staging area (stage 2). The fire truck 12 in the second stage pressurizes the water and provides the pressurized source of fluid via hose 18 to the mobile fire attack vehicle 10 remotely located at a third staging area (stage 3) in which the fire truck 12 may have difficulty and/or may not be able to gain access for various reasons.

The compact mobile fire attack vehicle 10 can be quickly and conveniently driven from the second staging area to the third staging area adjacent to the structural fire 13 defining the fourth staging area (fourth stage). From the third stage, a monitor 29 and/or various attack line hoses 28 may be extended from the compact mobile fire attack vehicle 10 over to the structural fire 13 and a continuous flow of a fire retardant may be expelled from the hoses 28 and/or monitor 29 onto the fire 13. Additional attack line hoses and/or other firefighting mechanisms (such as a monitor) may be integrated into the compact mobile fire attack vehicle 10 in an attempt to quickly attack and extinguish the fire 13.

Stage 1

In particular, stage 1 depicts tapping into and delivering a source of water from the water hydrant 11. The water to the hydrant 11 may be supplied by a private, county or local municipality. As shown, the water hydrant 11 may include conventional couplings, such as a five inch suction outlet 5 into which a typical fire truck 12 may connect a five inch hose 8. Alternatively, the water hydrant 11 may include at least one smaller outlet 3 (such as, for example, a three inch squirrel tail coupling) adapted to receive a smaller hose 2, for lower water duty supply applications. As will be described later, in a preferred embodiment, the mobile fire attack vehicle 10 may include a larger intake inlet 40 and at least one smaller intake inlet 40*a*.

Any number of various suitable sizes for the hoses and couplings may be implemented in accordance with this invention. For example, the hoses 2 and 8 may be provided with: (1) a Storz type Quick connect couplings in accordance with NFPA Standard 1963, 1997 edition; or (2) a lightweight extruded aluminum alloy, hard coated, rocker lug couplings, and/or the like. The various couplings may be composed of an expansion ring type, NH threads in accordance with NFPA 1963, 1997 edition.

In the second staging area, the fire truck 12 may be connected to the water hydrant 11 through the use of a five inch suction hose 8, and/or alternatively the two smaller squirrel tail hoses 2. In use, the fire hoses 2, 8, providing the supply of water, are connected at a first end to the water hydrant 11 and at a second end to the fire truck 12. In particular, at the second end, the hoses 2, 8 are connected to various intakes 14 disposed on the fire truck 12.

The water pressure used to deliver the water to the structural fire 13 in stage four may be supplied through the various stages under the natural pressure present within the hydrant 11. Alternatively, the fire truck 12 may be equipped with a pump unit 15 that is used to increase and regulate the pressure of the water delivered to the structural fire in stage 4. The pump unit 15 may be one of various commercially available pump units which may be adapted for use in accordance with this invention. Regulation of the water pressure fed from the fire truck 12 to the mobile fire attack vehicle 10 in the third staging area may be manually, semi-automatically and/or automatically controlled by fire personnel regulating hydraulic valves via a throttle. The progress of the fluid through the mobile fire attack vehicle 10 may be monitored by an instrumentation panel (and/or the like) located on the fire truck 12 and/or on the mobile fire attack vehicle 10.

Although a fire truck 12 is generically described in FIG. 2, it is to be understood that the fire truck 12 may be any number of fire emergency vehicles capable of receiving and carrying the compact mobile fire attack vehicle 10, such as a pumper fire truck, a tanker fire truck, a ladder fire truck and/or any other type of fire emergency response vehicle in accordance with this invention.

As conventionally known, the intake and/or supply line hoses 2, 8 may be stored in a hose bed compartment of the fire truck 12. The fire truck 12 may also include, for example, a Storz connector at the end of the supply hoses 2, 8 coming into the fire truck 12. A coupling and/or connector on the supply hoses 2, 8 will mate with another Storz fitting and/or connector on the fire-fighting vehicle compact mobile fire attack vehicle 10 to connect the water into the fire attack vehicle 10. In transport, the Storz coupling may be pre-attached to the fire attack vehicle 10 as it is carried on the rear of the fire truck 12. Alternatively, the Storz connector may be attached once the fire attack vehicle 10 is detached from the fire truck 12 and ready for deployment to the fire.

In the third stage, the fire attack vehicle 10 is shown dismounted from the fire truck 12 and driven to a location remote from the fire truck 12 and adjacent to the structural fire 13. A supply of water is transported from the fire truck 12 to the fire attack vehicle 10 via a supply hose 18. A first end of the supply hose 18 is connected to the fire truck 12 and a second end of the supply hose 18 is attached to an intake inlet 40 located on the fire attack vehicle 10. it is also to be understood that the supply of water may be made directly from the hydrant 11 to the mobile fire attack vehicle 10 without the fire truck 12 disposed there between and pressure in the hydrant can drive the water to the fire 13 in stage 4. Alternatively, it is possible to implement a pump unit onto the mobile fire attack vehicle 10 to increase the pressure of the water being fed there through.

As shown and described in more detail below, the mobile fire attack vehicle 10 may be equipped with various firefighting tools and equipment (as generically designated by reference 402) essential for fighting the fire 13. For example, the mobile fire attack vehicle 10 may be equipped with various types of firefighting tools and equipment 402, such as for example, scene/flood/spot lights. As shown in the figures, the scene/flood/spot lights may be integrated onto various suitable locations on the mobile fire attack vehicle 10. Various commercially available firefighting tools and equipment 402, such as: fire axes, pike poles, trash hooks, rescue (stokes) baskets, dry wall hook pike poles, a hooligan bar, a lantern, hoses and hose reels, monitors, SCBA tanks 406, SCBA seats, and various other fire tools now known or later discovered in accordance with this invention may be attached and/or stored in a compartment in the mobile fire attack vehicle 10.

Additional supplies may also be carried to a scene by the mobile fire attack vehicle 10 depending upon the needs of the individual fire department. For example, there can be a prefabricated metal compartment box 408 with a pair of sleeves that can be welded to the bottom that will slide on to the front forks 140 of the mobile fire attack vehicle 10. The compartment box 408 could be used to carry various supplies, such as for example, extra hose, extra nozzles, extra hand tools, ropes, other rescue supplies, extra EMS equipment, salvage tubs, salvage tarps, rehab supplies, and the like.

At least one advantage realized by the mobile fire attack vehicle 10 and the third stage is that, due to the constraints on the fire truck 12 (due to code or physical limitation), even though the fire truck 12 could not travel up the pathway or driveway 6, the firemen are easily and readily able to utilize the mobile fire attack vehicle 10 to swiftly travel to the head of the fire 13 with all of their essential firefighting equipment with ease. Conventionally, firemen would have had to laboriously drag their heavy and cumbersome hoses and other firefighting equipment up the long driveway to the fire 13. The advantage of this invention is that with the mobile fire attack vehicle 10, firemen could simply dismount the fire attack vehicle 10 from the fire truck 12, hook the first end of the supply hose 18 to the fire truck 12 and the second end to the mobile fire attack vehicle 10 and quickly drag the supply hose 18 attached to the mobile fire attack vehicle 10 to the third staging area adjacent to the fire 13 nearly effortlessly.

From a storage position on the fire truck 12, the supply hose 18 may be unwound and aligned along a roller bar 41 (see FIG. 1) disposed at the back of the fire truck 12 and/or over the smooth surface of the roller bar 41. The roller bar 41 may be constructed as a rotatable bar that was conducive to unwinding and aligning the supply hose 18 outward and away from the fire truck 12. The roller bar 41 may be adjustable about 360 degrees of freedom to provide a roller surface that would best facilitate the unwinding of the supply hose 18 away from the fire truck 12 with as little friction and snagging as possible. Alternatively, the roller bar 41 may be constructed as a guide into which the supply hose 18 is fed to align the unraveling of the supply hose 18.

Another advantage of the mobile fire attack vehicle 10 is that firefighters can easily transport their firefighting equipment to the fire 13. In accordance with this invention, transport of the supply hose 18 and the necessary firefighting equipment from the fire truck 12 up the hill adjacent to the fire 13 can be performed very quickly and with little effort. Yet another advantage to the mobile fire attack vehicle 10 is that the firefighters arriving at the scene of the fire 13 can engage the fire quickly, energized and ready to attack the fire. Since the safety of a person's life is the key element in an emergency, with the assistance of the fire attack vehicle 10, firemen are able to perform search, rescue and firefighting operations in an expedient manner. Likewise, the fire attack vehicle 10 further improves on the response time to overhaul and suppress a fire.

As mentioned previously, as well as having firefighting capabilities, the mobile fire attack vehicle 10 is equipped with search and rescue capabilities. In search and rescue mode, the mobile fire attack vehicle 10 may be equipped with human locating technologies (such as infra-red) to locate a victim. Once the victim has been located, the mobile fire attack vehicle 10 may be use to extract the victim from the dangerous environment.

Figure 3:
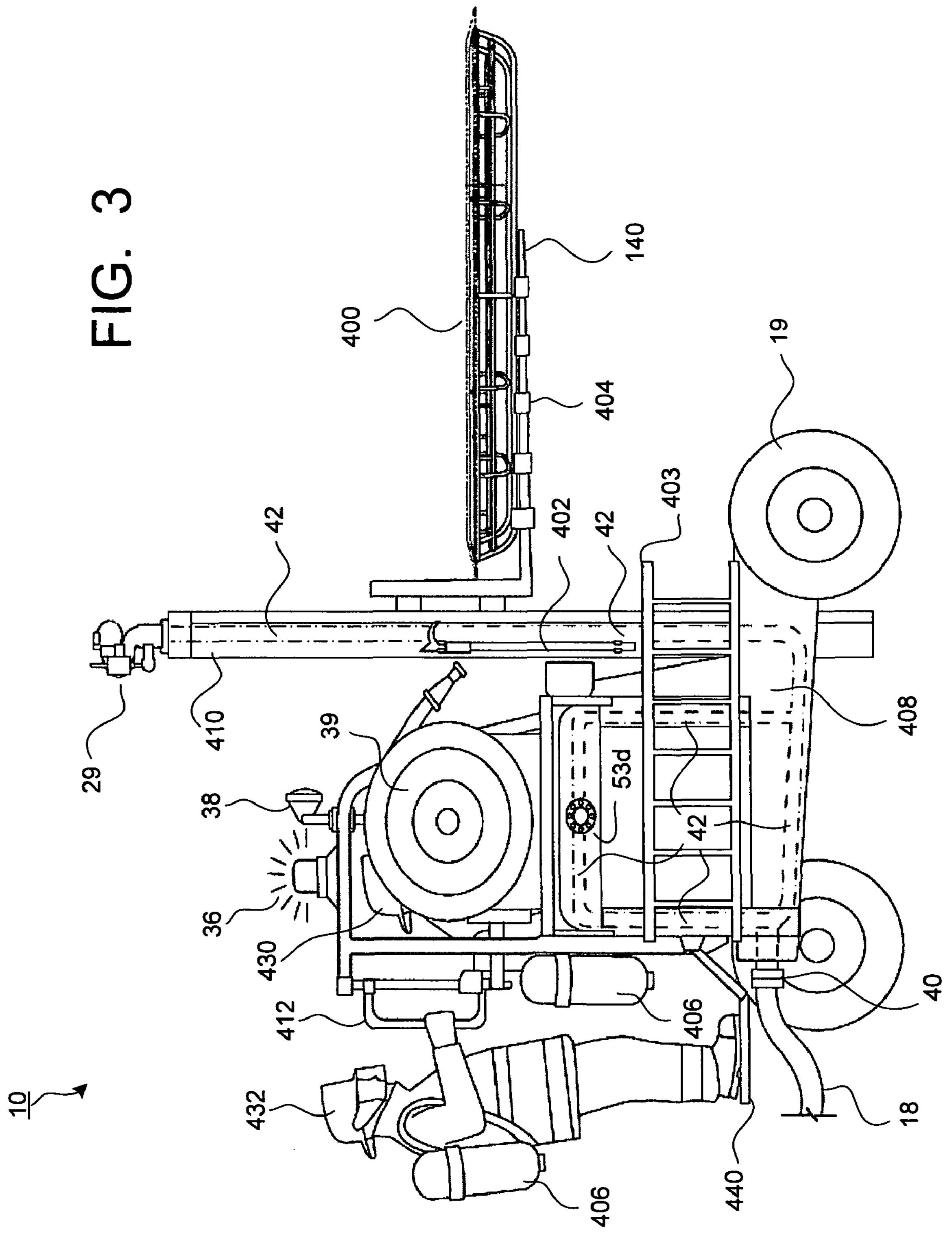
FIG. 3 depicts a side view of an exemplary illustration of the compact fire-fighting vehicle including a rescue basket according to this invention.

FIG. 3 illustrates the mobile fire attack vehicle 10 adapted to be used with a rescue basket 400. As shown, the rescue basket 400 may be carried by the forks 140 of the mobile fire attack vehicle 10. In use, the rescue basket 400 may be secured to the mobile fire attack vehicle 10 with the use of fork receiving collars 404. The forks 140 may be slid into the fork receiving collars 404 and the rescue basket 400 may be secured thereto. The injured victim may be raised a safe distance above the ground. That is, the forks 140 may be raised within the fork lift guide track 410 to a safe height where the mobile fire attack vehicle 10 may then carry the victim out of danger to safety.

Although FIG. 3 shows the rescue basket 400 aligned lengthwise along the length of the forks 140, it is also within the contemplation of this mobile fire attack vehicle 10 to orient the rescue basket perpendicular to the length of the forks 140 and/or any other suitable position in which the rescue basket may be secured to the forks 140. The rescue basket 400 may be secured to the forks 140 with any number of securing methods, including but not limited to, a clamp, a pin, a strap and/or any other mode for securing the rescue basket 400 to the forks 140.

FIG. 3 also shows a ladder 403 adapted for use and disposed on the mobile fire attack vehicle 10. The ladder 403 may be any type of ladder, such as an attic ladder, a roof ladder, and/or a 24-foot extension ladder. The ladder 403 may be placed in a variety of different locations, such as on top of the driver's cage, or on top of the front forks 140 for rescue and/or second story access to a structure. The ladders 403 may be taken off the fire truck 12 and secured to the mobile fire attack vehicle 10 by clamps, straps, and/or any other means for securing the ladder 403.

Referring back to FIG.2, from the fire mobile attack vehicle 10 located in stage 3, attack line supply hoses 28 may be adapted for use with the mobile fire attack vehicle 10. The attack line supply hoses 28 may be connected at a first end to the fire attack vehicle 10. The second end of the attack line hose 28 may be unwound and extended from the mobile fire attack vehicle 10 to the fire 13 by a firefighter. Various suitable commercially available firefighting reels and spools may be adapted for use with the mobile fire attack vehicle 10 in accordance with this invention. As shown in stage four and by way of example, two 1-¾ inch attack line hoses 28 may be extended from the fire-fighting mobile fire attack vehicle 10 to a location at and/or in the structure on fire 13. As shown, the attack line hoses 28 are unreeled from a reel mounted on the mobile fire attack vehicle 10 to the fire 13. Likewise, it is possible to drive the mobile fire attack vehicle 10 close enough to douse the fire 13 with the use of the monitor 29 mounted on the mobile fire attack vehicle 10.

The mobile fire attack vehicle 10 may be plumbed with any size hose appropriate to deliver a desired amount of water to the fire 13. For example, the mobile fire attack vehicle 10 may be equipped with a 5-inch or 4-inch supply hose 18 from the fire truck 12. The supply hose 18 may be fitted to supply at least one of a 5-inch NH intake hose, and/or a 2.5-inch NH discharge valve used to supply the at least one fire attack supply hose 28 and/or a fire monitor 29 mounted to the fire attack vehicle 10. Just as described on the fire truck 12, the mobile fire attack vehicle 10 and/or the attack supply hoses 28 may be equipped with valves used to control the incoming pressurized volumetric flow of water from the main supply hose 18 coming from the fire truck 12.

It is also to be understood, that the mobile fire attack vehicle 10 may supply any number of fire retardant materials to the fire 13, such as for example, water, foam and/or any other type of extinguishing material now known or later discovered in accordance with this invention.

Figure 4:
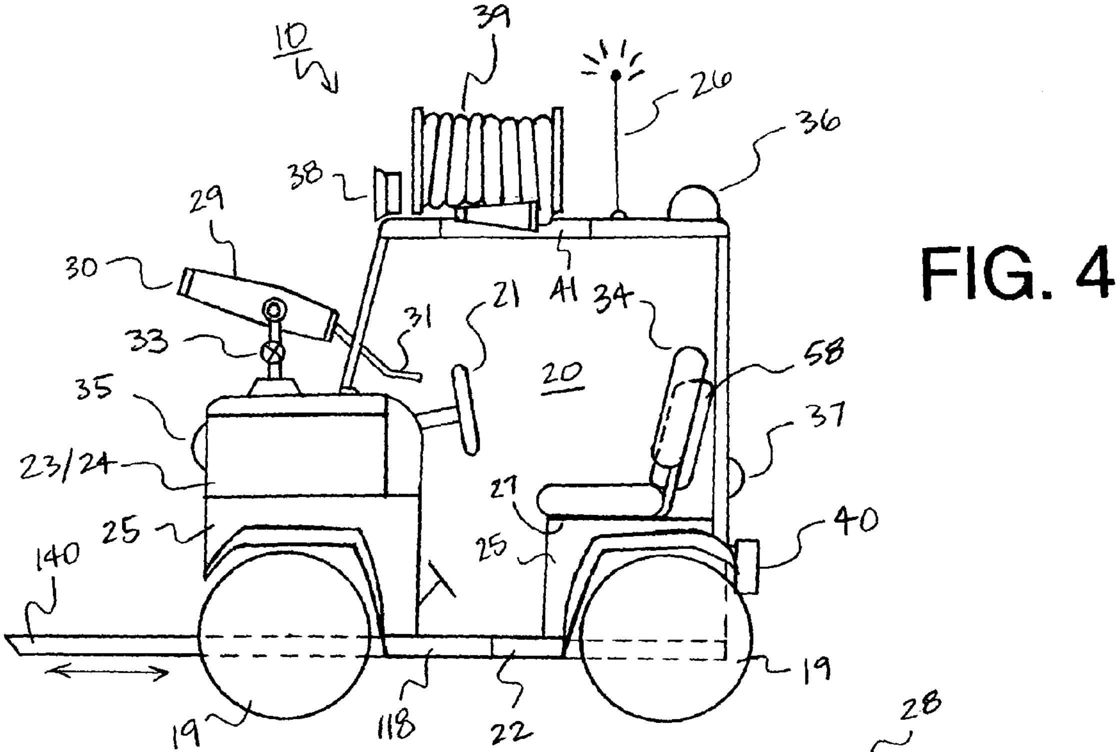
FIG. 4 depicts a side view of a first exemplary illustration of the compact fire-fighting vehicle according to this invention.

FIG. 4 depicts an exemplary illustration of the mobile fire attack vehicle 10. As shown, the mobile fire attack vehicle 10 is a self-contained drivable unit including a structural chassis 22 including a reinforced passenger compartment 20, wheels 19, and a steering mechanism 21. As never done before and in accordance with this exemplary embodiment, the mobile fire attack vehicle 10 is illustrated as a mobile vehicle including a pair of forks 140 used for more than merely carrying and hauling objects from one location to another. The forks 140 include a plethora of various uses including storing the mobile fire attack vehicle 10 onto a storage frame disposed on a fire truck 12 as shown in FIG. 1. Likewise, the forks 140 have additional other uses including fire and rescue applications. For example, as previously shown and described in FIG. 3, the forks 140 may be used to hold a rescue basket 400 on top of which a victim may be secured and removed from a dangerous environment in a safe and expedient manner. The forks 140 may also be used for applications commonly used by conventional fork-lifts, such as by lifting and hauling heaving objects on a flat palette-like base.

Referring back to FIG. 4, the wheels 19 of the mobile fire attack vehicle 10 may be composed of air filled tires, solid rubber tires, track wheels (e.g., for example tank-track conveyor tracks), and/or any other efficient types of transport mechanism for ground locomotion.

It is also to be understood that the mobile fire attack vehicle 10 may be a self contained unit. That is, the mobile fire attack vehicle 10 may include various compartments for storage of various materials and other items useful in fighting fires and handling other emergencies. For example, at least one compartment 25 may be provided for storing supplies, fire extinguishing material, such as water, foam and/or any other fire retardant now known or later developed in accordance with this invention.

Figure 5:
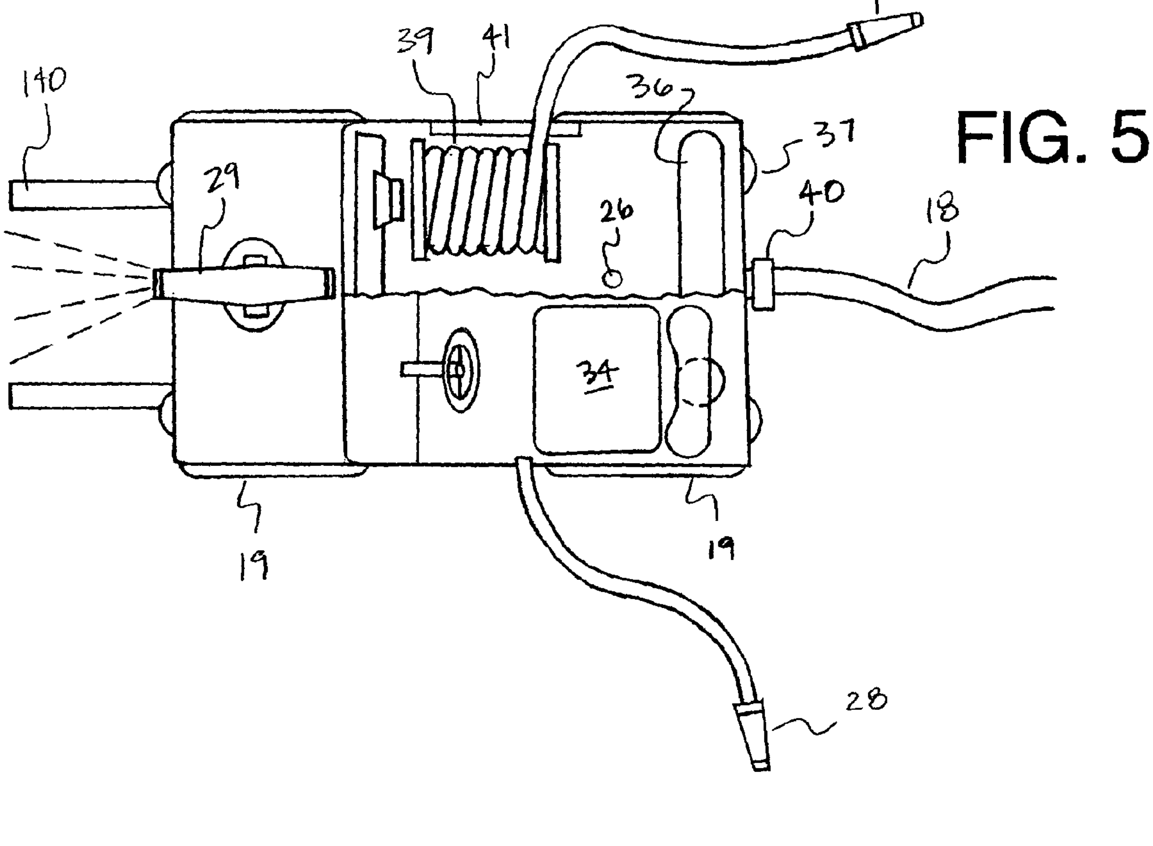
FIG. 5 depicts a top view of the first exemplary illustration of the compact fire-fighting vehicle according to this invention.
Figure 6:
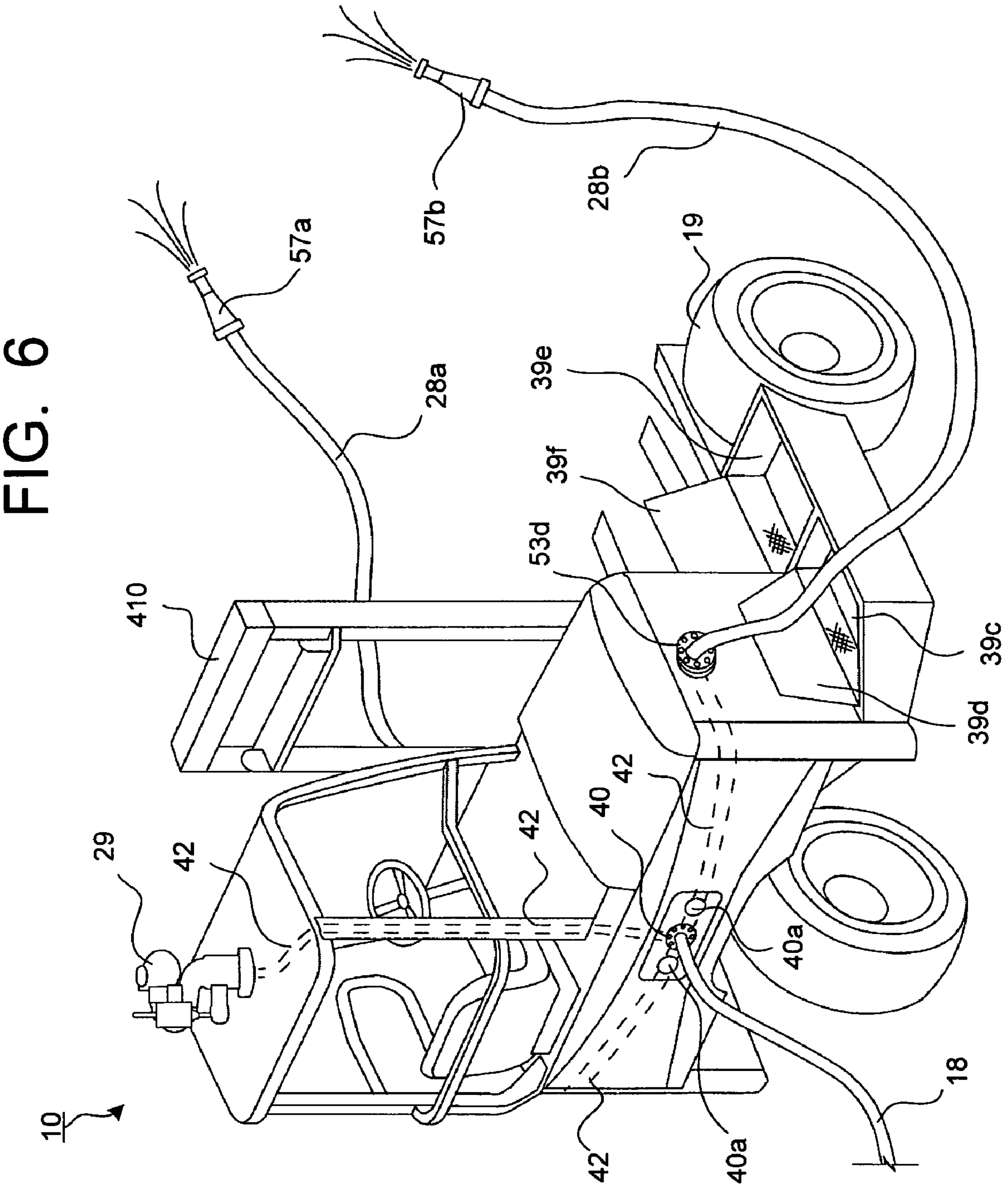
FIG. 6 depicts an exemplary illustration of the compact fire-fighting vehicle in operation mode according to this invention.

Referring to FIG. 3 and FIG. 6, the compartments may have other uses. For example, the mobile fire attack vehicle 10 may be constructed with at least one elongated hose compartment 408 into which one or more hoses may be stored. The hose compartment 408 may be used to store the supply hoses from the fire truck to the mobile fire attack vehicle 10 and/or other hoses that are extended from the mobile fire attack vehicle 10 to the fire 13. Likewise, as shown in FIG. 5, the compartment may be composed of various smaller sub-compartments 39*c* and 39*e*. As shown, sub-compartment 39*c* includes door 39*d* and sub-compartment 39*e* includes door 39*f*.

In operation, if the supply hose 18 is stored in the hose compartment 408, a first end of the hose 18 may be attached to the fire truck 12 and as the mobile fire attack vehicle 10 drives away from the fire truck 12, the supply hose 18 may be unwound from within the hose compartment 408 in the mobile fire attack vehicle 10.

Alternatively and as shown in FIG. 6, if the attack hoses 28*a*, 28*b* are stored in the compartment 39*c*, 39*e*, when the mobile fire attack vehicle 10 arrives adjacent to the fire 13, the firefighters may connect one end of the attack hose 28*a*, 28*b* to the outlets 53*c* (not shown) and 53*d* of the mobile fire attack vehicle 10, and the other end may be conveniently extended by the firefighter to a location adjacent to, or inside of, the structural fire 13.

Referring to FIGS. 4 and 5, the mobile fire attack vehicle 10 may, or may not, be an all wheel drive vehicle and may be powered by one of a variety of different engine 23 types. The engine 23 may be a combustion engine and/or a battery powered electric propulsion vehicle. As an electric fire attack vehicle 10, the vehicle 10 is preferably driven by at least one electric motor from which current is drawn from the batteries. The engine 23 will act directly at least one wheel 19 to propel the fire attack vehicle 10. Foot pedal controls (such as brake and acceleration) will project out of the standing platform 33 for use by the driver. Additionally, the mobile fire attack vehicle 10 may be equipped with a hand-operated brake (not shown).

As an electric powered attack vehicle 10, the vehicle 10 may include a compartment 24 into which the rechargeable batteries may be stored. When the mobile fire attack vehicle 10 is re-mounted onto the fire tuck 12, a recharging line may be reattached between the mobile fire attack vehicle 10 and an electric power source on the fire truck 12 to recharge the batteries (regular or rechargeable and or any other charging medium) on the mobile fire attack vehicle 10 for the next use.

The mobile fire attack vehicle 10 may also be remotely controlled via a wireless remote control device (not shown). The advantage of the remote control capabilities is that the mobile fire attack vehicle 10 could move closer to the fire 13 and attack the flames at a much closer range, withstanding higher heat temperatures than a human can endure.

The mobile fire attack vehicle 10 may also be equipped with various types of rescue equipment, breaking material, firefighting equipment and tools 402 essential for fighting a fire, including, but not limited to, for example, fire axes, Hooligan entry tools, fiberglass pike poles, a stokes or rescue basket, dry wall hook pike poles, fire extinguishers, portable rechargeable flashlights, and any other type of firefighting equipment and/or tools necessary in fighting a fire which are now known or later discovered. As described above, various equipment and other firefighting tools 402 may be secured onto brackets on the mobile fire attack vehicle 10 and/or stored in drawers or compartments 25 provided on the mobile fire attack vehicle 10 to store other firefighting tools or the like.

The mobile fire attack vehicle 10 may also be equipped with a radio communications device 26 so that the firefighters traveling with the mobile fire attack vehicle 10 can easily communicate back with an incident command base proscribing instructions to the firemen. Alternatively, the mobile fire attack vehicle 10 may automatically send information back to the incident command base autonomously or via an instruction issued by remote control from the incident command base.

Various types of data information may be sent between the mobile fire attack vehicle 10 and the incident command base location. For example, images may be taken by a camera (not shown) mounted on the fire attack vehicle 10. The images may be wirelessly transmitted back to the incident command base (or visa-versa) so that fire personnel fighting the fire can gather as much intelligence about the fire in order to combat the fire. The mobile attack vehicle 10 may also include a portable mounted thermal imaging camera (not shown) and an embedded display through which the firefighters responding to the emergency can view heat diagrams of the victims in the fire. Topographical layout (or infrared images) may captured and transmitted from the incident command base to the mobile fire attack vehicle 10 so that firefighting personnel can view (in otherwise very difficult to see areas—such as smoke filled rooms) the surrounding areas in which they are traversing.

Audible sounds may be picked up and amplified by microphones (not shown) located on the fire attack vehicle 10, such as an injured person yelling out for help. A speaker (not shown) may be mounted on the mobile fire attack vehicle 10 so that the incident command base station may communicate information from the incident command base through the mobile fire attack vehicle 10 to persons in the vicinity of the fire 13. A variety of different uses may be employed through the use of the communications device embedded on the fire attack vehicle 10.

A monitor 29 may be integrated onto the fire attack vehicle 10. Any number of commercially available monitors may be adapted for portable use in accordance with this invention. The monitor 29 is provided with a fire retardant fluid such as water, foam or some other fluid used to combat the fire 13. The monitor 29 includes an adjustable spray unit 30. The spray unit 30 can be adjusted by a handle 31. The monitor 29 may be employed as a water nozzle and/or a foam cannon. A valve 33 may be used to operably switch the monitor 29 between the use as a water nozzle and as a foam cannon.

FIG. 5 illustrates in more detail attack hose 28 lines implemented to reach remote locations from the mobile fire attack vehicle 10 and/or other inaccessible locations difficult for the mobile fire attack vehicle 10 to reach. Referring back to FIG. 2, additional attack hoses 28 may be fluidly connected to the intake inlet 40 in the fire attack vehicle 10. As shown in FIGS. 2, 5 and 6, fire attack line hoses 28 may be extended to a fire 13 quite a distance away from the fire attack vehicle 10.

In the exemplary embodiment, the mobile fire attack vehicle 10 includes a platform 27 defined at the top portion of storage compartment 25 located adjacent to the rear wheel. During operation, the platform 27 may serve to support a pair of seats 34 onto which a driver and a passenger firefighter may be supported. The seats 34 in the mobile fire attack vehicle 10 may be configured in a variety of different ways. For example, the seats may be fixed or constructed as a pedestal swivel mounted seat. The seat 34 may be adapted to include and/or receive a self contained breathing apparatus pack (SCBA 58), as is mounted in a conventional fire truck 12. The SCBA seats may be equipped with an appropriate SCBA bracket based on the individual needs of the firefighter so that the firefighter may comfortably sit in the mobile fire attack vehicle 10 with their removable SCBA pack 58 comfortably and accessibly located within the seat 34.

Various commercially available SCBA's may be adapted in accordance with this invention. Likewise, the SCBA incorporated herein may be a fixed and/or pedestal swivel mounted self contained breathing apparatus (SCBA). The SCBA may be adapted for various uses, such as for example for forward or reverse seating and for sitting or standing and/or the like. Various adaptations are possible in accordance with this invention.

The mobile fire attack vehicle 10 may include various illumination devices, e.g., headlights 35, emergency flashing lights 36, tail and brake lights 37, and a search light 38, and/or fire scene lights 38 mounted to the fire attack vehicle 10. As mentioned above, various adaptations are possible for an illumination lamp in accordance with this invention.

As shown in FIG. 3, the mobile fire attack vehicle 10 may also include attached to the mobile fire attack vehicle 10, a step plate 440 onto which the passenger firefighter may securely stand while in route to the fire 13. The step plate 440 may be a fixed structure or it may be a folding step plate onto which a passenger firefighter 432 may stand and secured herself. A trailer hitch (not shown) and/or various other devices may be attached to the mobile fire attack vehicle 10 in accordance with this invention.

The hoses, such as the attack hoses 28 of the mobile fire attack vehicle 10 may be stored in a variety of different places. For example, the hoses may be stored on a retractable reel assembly 39 as shown in FIGS. 3 and 4. Likewise, the hoses may be stored in a hose storage compartment 39*c*, 39*e* as shown in FIG. 6. In use, one end of a first attack hose 28*a* is connected to a first valve 53*c* and a second end is extended by a firefighter to the fire 13. Likewise, FIG. 6 also illustrates a second attack hose 28*b* connected to a second valve 53*d* and a second end is extended by a firefighter to the fire 13.

The attack hoses 28 may attack hoses of various sizes, including for example: 1-¾", 2", 3", 3-½" fire hose attack lines, and the like. The attack hoses 28 may be wound on the retractable reel assembly 39 (as shown) and/or flat loaded in a tray (not shown) on the fire attack vehicle 10. In the alternative and as shown in FIGS. 3 and 6, the hoses may be stored in the hose boxes 408, 39*c*, 39*e* and unwound during use. In each of these configurations the advantage to the firefighter is that they do not have to carry or drag the heavy hoses out to the fire, instead, the hose may be quickly and easily transported on the mobile fire attack vehicle 10 from the fire truck 12 to the fire 13.

Similar to the roller bar 41 illustrated in FIG. 1, the attack line hoses 28 may be unwound from the mobile fire attack vehicle 10 along a roller bar 41 attached to the mobile fire attack vehicle 10 and/or over a smooth surface that is rotatable and conducive to unwinding as well as to providing for alignment of the attack line hoses 28 outward and away from the mobile fire attack vehicle 10. The roller bar 41 may be adjustable about 360 degrees of freedom to provide a smooth roller surface that would best facilitate the unwinding of the attack line hoses 28 away from the mobile fire attack vehicle 10 with as little friction and snagging as possible.

The fire attack vehicle includes a pair of forks 140 that are slidably received within a pair of respective spaced apart fork support bars or sleeves 118. The forks 140 may be retractably disposed on the lower end of the fire attack vehicle 10. The forks 140 may be configured to retractably slide into and out of the sleeves 118. The sleeves 118 may be longitudinally extended from the front of the mobile attack vehicle 10 to the rear of the vehicle 10. Explained and described in more detail later in FIGS. 3 and 6, when the forks 140 are extended, the forks 140 may be used to secure the mobile attack vehicle 10 to a mounting mechanism located at the rear of the fire truck 12. When the mobile fire attack vehicle 10 is in use, the forks 140 are tucked away retracted and stored within the sleeves.

The forks 140 may be adjusted so that the forks may be adjusted from a narrow positioning to a wide spaced apart positioning. Various advantages may be realized from the adjustable forks. In one position, the forks may be adapted to carry items, such as the rescue basket 400 described and shown in FIG. 3. Likewise, the forks may have other added benefits in that other useful applications may be provided with the forks 140. For example, the forks 140 may be used as a battering ram to break through walls of a burning or otherwise secured structure. Various attachments may be adapted and secured to the forks t assist in the battering of a wall or other surface. The forks 140 may be used to retrieve and lower a victim from a second floor window to the ground level in a burning structure. The forks 140 may also be lift and remove heavy objects, such as for example, where a second vehicle is lying on top of a first crush vehicle and a victim lodged in the first lower crushed vehicle. The forks 140 may be used to lift the top vehicle off of the lower vehicle to allow egress to the victim trapped in the lower vehicle. A variety of different applications are possible through the use of the forks 140 on the mobile fire assisted vehicle 10.

It should be noted that various types of vehicles may be adapted in accordance with this invention to include a mounting mechanism. For example, an all terrain quad and/or three wheeled vehicle may be retrofitted with the mounting mechanism in accordance with this invention and portably attached to the rear end of the fire truck 12. Furthermore, various implementations are possible and those described herein are merely exemplary. The mobile fire attack vehicle 10 can even include outriggers to provider additional support to its base when it has arrived to its location at stage 3 described above.

FIG. 6 illustrates the mobile fire attack vehicle 10 as a three wheel 19 mobile fire attack vehicle 10 including forks 140 arranged much like a conventional fork lift. In general, the mobile fire attack vehicle 10 is integrated with a monitor 29, at least one intake inlet 40 for receiving water from a water source, such as a fire truck 12, and a reel assembly 39 for carrying at least one attack hose. Likewise, the hoses may be stored in any convenient location on the mobile fire attack vehicle 10, such as in the hose compartments 39*c*, 39*e*.

Figure 7:
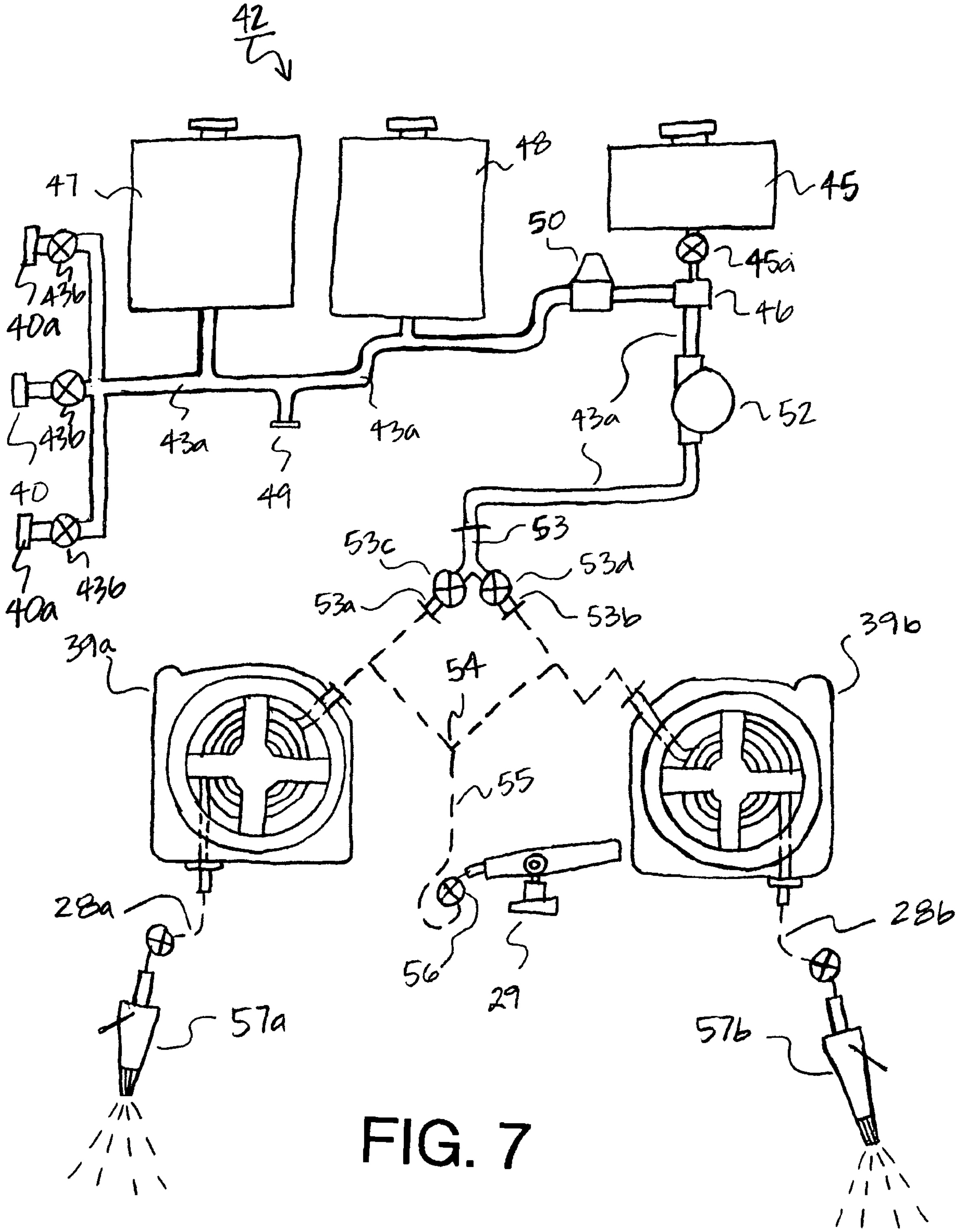
FIG. 7 depicts an exemplary fluid diagram within the compact fire-fighting vehicle according to this invention.

FIG. 7 illustrates a plumbing diagram for an exemplary fluid system 42 within the mobile fire attack vehicle 10 according to the present invention. FIGS. 3 and 6-11 also illustrate the exemplary fluid system 42. In more detail, FIG. 6 shows a main intake inlet 40 disposed at the rear end of the mobile fire attack vehicle 10. Throughout the mobile fire attack vehicle 10, such as for example along the chassis 22 and other structurally portions of the mobile fire attack vehicle 10, various elements of the fluid systems 42 may constructed and interconnected through a series of plumbing pipes 43*a*, 53*a* and 53*b* as demonstrated in FIG. 7. Although described as being plumbed within the platform 27 of the chassis 22, the fluid system 42 may be plumbed anywhere along in the fire attack vehicle 10 as will be shown and described in FIGS. 3 and 6-11.

In particular, the fluid diagram of FIG. 7 illustrates intake inlet 40 into which a main supply of water is received from the main supply hose 18 extending from the fire truck 12. Smaller intake inlets 40*a* are also provided on the mobile fire attack vehicle 10 to receive a supply of a fire extinguishing fluid. As shown, valves 43*b* may be provided to control the supply of fluid entering into the fluid system 42. Various commercially available valves may be use in accordance with this invention, including by not limited to, a stop valve, a ball cock valve, an electric actuator valve, and/or any other valve suitable for controlling the flow of fluid through the various intake inlets 40, 40*a*. The valves 43*b* may be controlled manually, semi-automatically and/or automatically in accordance with this invention.

The various intake inlets 40, 40*a* provide on the fed into the mobile fire attack vehicle 10 can supply various types of an external extinguishing material, e.g., from the hydrant 11 and/or from the fire truck 12, such as a pumper fire truck. Among the various types of an external extinguishing material that may be fed into the intake inlets 40, 40*a* may include, but are not limited to water, foam, a chemical extinguishing material and/or any other fire retardant material now known or later discovered.

It is to be understood that the intake inlet may be comprised of various inlets adapted for various size inlet attachments, such as for example on a fire truck 12, at least a first larger inlet (herein shown as intake inlet 40) is provided and at least another smaller inlet (herein shown as smaller intake inlets 40*a*) may be provided to receive smaller inlet hose fluid sources (such as the three inch squirrel tail hoses on the water hydrant 11 described in FIG. 2).

By way of example in FIG. 7, the intake inlet 40 will be the intake inlet commonly referred to herein. The main intake inlet 40 may be connected via a plumbing pipe 43*a* to a first tank 47 and/or a second tank 48. The first tank 47 may be disposed as a water tank and the second tank 48 may be provided as a concentrated foam tank. The plumbing pipe 32*a* may be connected to a bottom side of the first tank 47 and to a bottom side of the second tank 48. A drain 49 may be provided along the plumbing pipe 43*a* at a low point in the fluid system 42 to drain any remaining fluid in the fluid system 42 after use.

The plumbing pipe 43*a* may include a water filter 50 in the fluid system 42. Furthermore, an additive mixer 45 may be disposed along the plumbing pipe 43*a*. The additive mixer 45 may be connected though a regulating valve 45*a* to an adapter 46 in plumbing pipe 43*a*. In the additive mixer 45, various materials may be added in the fluid system 42 as a fire retardant to be delivered to the fire 13. The fluid extinguishing water entering the adapter 46 may be enriched with a concentrate added in the additive mixer 45 to produce a fire retardant material. The additive mixer 45 may be included at a variety of different locations within the fluid system 42.

The adapter 46 may be provided as an induction/metering device on the pipe 32*a*. A regulating valve 45*a* may be provided at the bottom side of the additive mixture 45 to act as an on/off switch for the flow of, for example, concentrated foam into the downstream pipe 43*a*.

A pump 52 may be provided in the fluid system 42 positioned along the plumbing pipe 43*a* downstream of the additive mixture 45. The pump 52 may be provided to draw the foam, water and/or other retardant from the main intake, and/or the respective tanks 47, 48 though the induction-metering device 46 at a desire quantity. In the absence of the tanks 47, 48, water and/or other fire retardant may be drawn in from the fire truck 12, directly from the water hydrant 11, and/or other fire preventing fluid source in which the mobile fire attack vehicle 10 may be connected.

Downstream of the pump 52, the plumbed pipe 43*a* may include a Y-pipe coupling 53. Various commercially available Y-pipe coupling devices may be adapted for use in accordance with this invention, including but not limited to, a commercially available Snap-tite gated wye fluid connection. As shown, various valves may be integrated into the Y-coupling to control the flow of the fluid being discharged. A plumbing first leg 53*a* in the Y-pipe coupling 53 may include a first valve 53*c* for a first attack line hose 28*a* that emergency personnel may use to remotely fight the fire 13. Likewise, a second plumbing leg 53*b* in the Y-pipe coupling 53 may include a second valve 53*d* for a second attack line hose 28 that a second emergency personnel may use to remotely fight the fire 13.

The first and second attack line hoses 28*a*, 28*b* may be stored on retractable reel assemblies 39*a*, 39*b* (as shown in FIG. 7) and/or in a hose box compartments 408, 39*c*, 39*e* as shown in FIGS. 3 and 6. Each of the attack line hoses 28*a*, 28*b* may be extended from their respective retractable reel assemblies 39*a*, 39*b* and/or hose box compartments 39*c*, 39*e* as the firefighting personnel walk away and drag the attack line hoses 28*a*, 28*b* from the mobile fire attack vehicle 10 out toward the fire 13. A suitable nozzle 57*a*, 57*b* may be provided on the attack line hoses 28*a*, 28*b* to control the flow of liquid through each of the attack line hoses 28*a*, 28*b*.

Beyond the Y-pipe coupling 53 split, the plumbing pipe defining the first leg 53*a* and the second leg 53*b* may reconverge at a junction 54 to form a single plumbing pipe 55. The plumbing pipe 55 may further extend to a predetermined location on the mobile fire attack vehicle 10 to a monitor 29 in which the fluid supply may be supply thereto.

The monitor 29 may be, either manually or electrically, manipulated to direct the fire-retardant liquid toward the fire 13 from a safe distance away from the actual fire 13. Various controls may be implemented to regulate and control the fire retardant onto the fire 12. For example, the manipulation of at least one control valve 56 would allow the operator of the mobile fire attack vehicle 10 to properly select the usage and amount of the fire-retardant liquid to be applied and its application onto the fire 13. Alternatively, the manipulation of the various valves on the mobile fire attack vehicle 10 may be performed remotely by a remote operator having a remote control device located safely at distant location such as from an incident command base.

Figure 8:
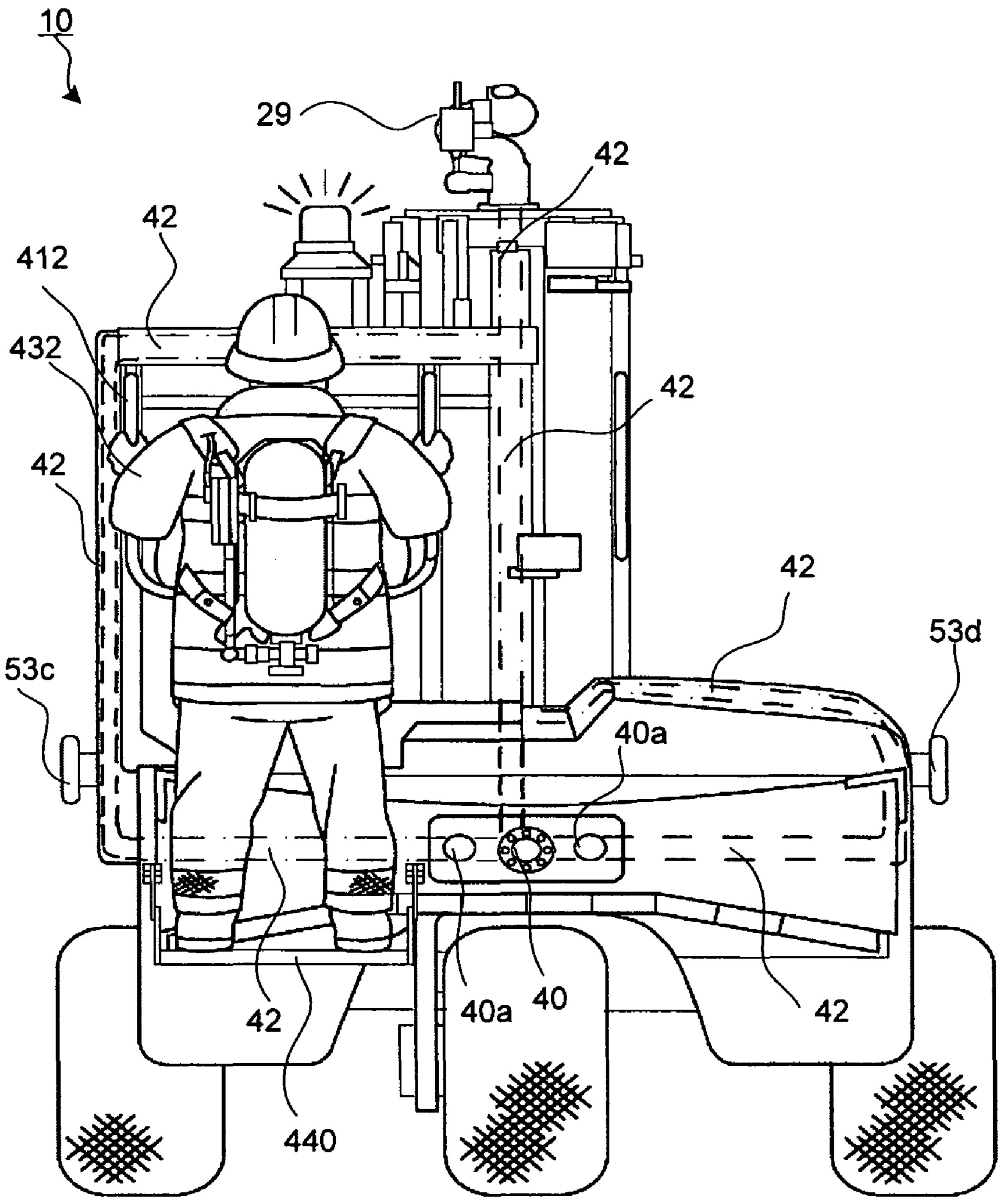
FIG. 8 depicts a rear view illustration of the compact fire-fighting vehicle in accordance with this invention.

FIGS. 3 and 7-11 illustrate the versatility in which the fluid system 42 may be implemented onto the mobile fire attack vehicle 10. For example, FIG. 8 shows a rear view of an exemplary mobile fire attack vehicle 10 in accordance with this invention. The mobile fire attack vehicle 10 depicts a pair of firefighters 430, 432 (only the passenger firefighter 432 is shown and not the firefighter driving 430) riding on the mobile fire attack vehicle 10. For safety precautions, the passenger firefighter 432 is shown harnessed behind the driver firefighter 430 into a passenger position and bracing his position by gripping onto supports 412. The passenger firefighter 432 may be positioned in a variety of different ways. For example, as better shown in FIGS. 3, 8, 9 and 10, the passenger firefighter 432 is in a standing position atop a standing platform 440 during transport on the mobile fire attack vehicle 10. For safety precautions, it is to be understood that the passenger firefighter who may be standing or sitting is to be harnessed and/or tethered to the mobile fire attack vehicle 10.

Figure 11:
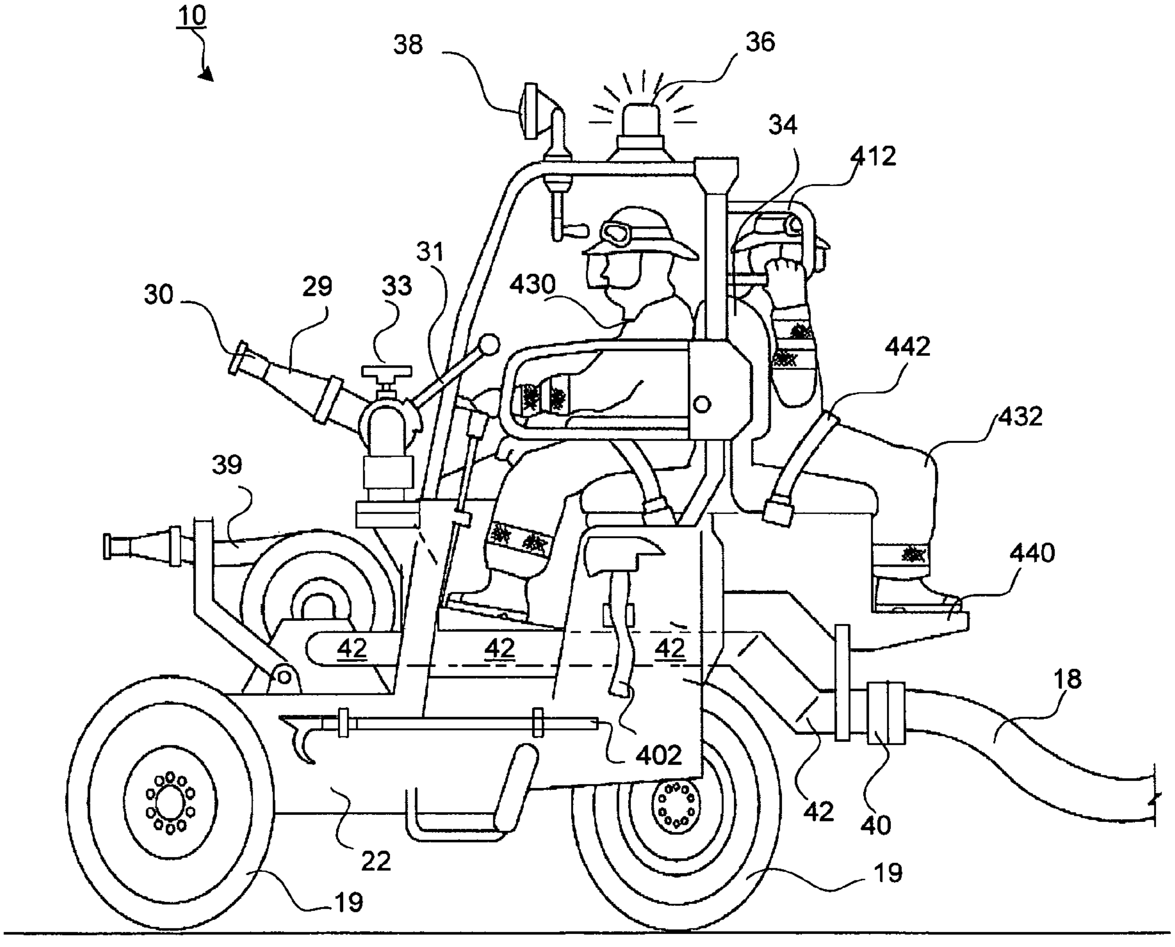
FIG. 11 depicts another exemplary side view of the passenger firefighter sitting in accordance with this invention.

In the alternative, FIG. 11 depicts the passenger firefighter 432 being secured on the mobile fire attack vehicle 10 in a seat 34, such as an SCBA type seat in which the seat is adapted to receive an SCBA tank. It is to be understood that the firefighting personnel may be suitably positioned anywhere on the mobile fire attack vehicle 10 in accordance with this invention.

Referring back to FIG. 8, the fluid system 42 diagram shows a main intake inlet 40 and two smaller intake inlets 40*a*. The main intake inlet 40 is attached to a main supply hose 18 (as shown in FIG. 3) from which a fire retardant may be fed in from the fire truck 12 or a water hydrant 11.

Figure 9:
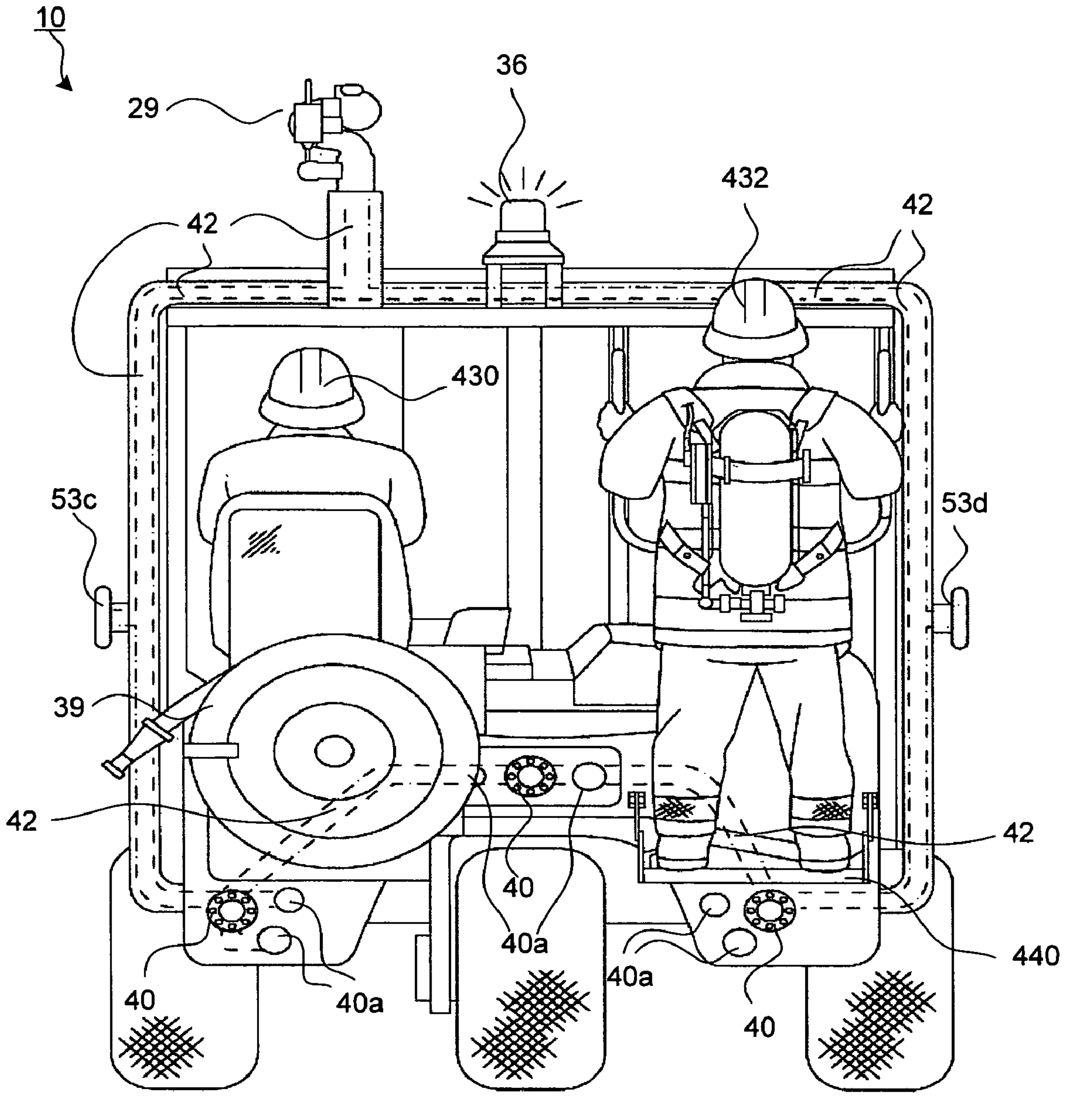
FIG. 9 depicts another exemplary rear view illustration of the compact fire-fighting vehicle in accordance with this invention.

In particular and as shown in dashed line in FIGS. 8 and 9, the fluid retardant enters the fluid system and is allowed to flow to a first outlet valve 53*c* on a first side of the mobile fire attack vehicle 10 and a second outlet valve 53*d* located on an opposite side of the mobile fire attack vehicle 10.

As shown in FIG. 7, a first attack line hose 28*a* having nozzle 57*a* is attached to first outlet valve 53*c* on a first side of the mobile fire attack vehicle 10. Likewise, a second attack line hose 28*a* having nozzle 57*b* is attached to second outlet valve 53*d* on a second side of the mobile fire attack vehicle 10.

FIG. 9 depicts another exemplary configuration for the mobile fire attack vehicle 10 in which a pair of firefighters 430, 432, i.e., a passenger firefighter 432 and a driving firefighter 430 are shown riding on the mobile fire attack vehicle 10. In this configuration, the passenger firefighter 432 is riding on the mobile fire attack vehicle 10 on an opposite side. The fluid system 42 diagram also shown in hidden lines shows another exemplary adaptation in accordance with this invention.

Figure 10:
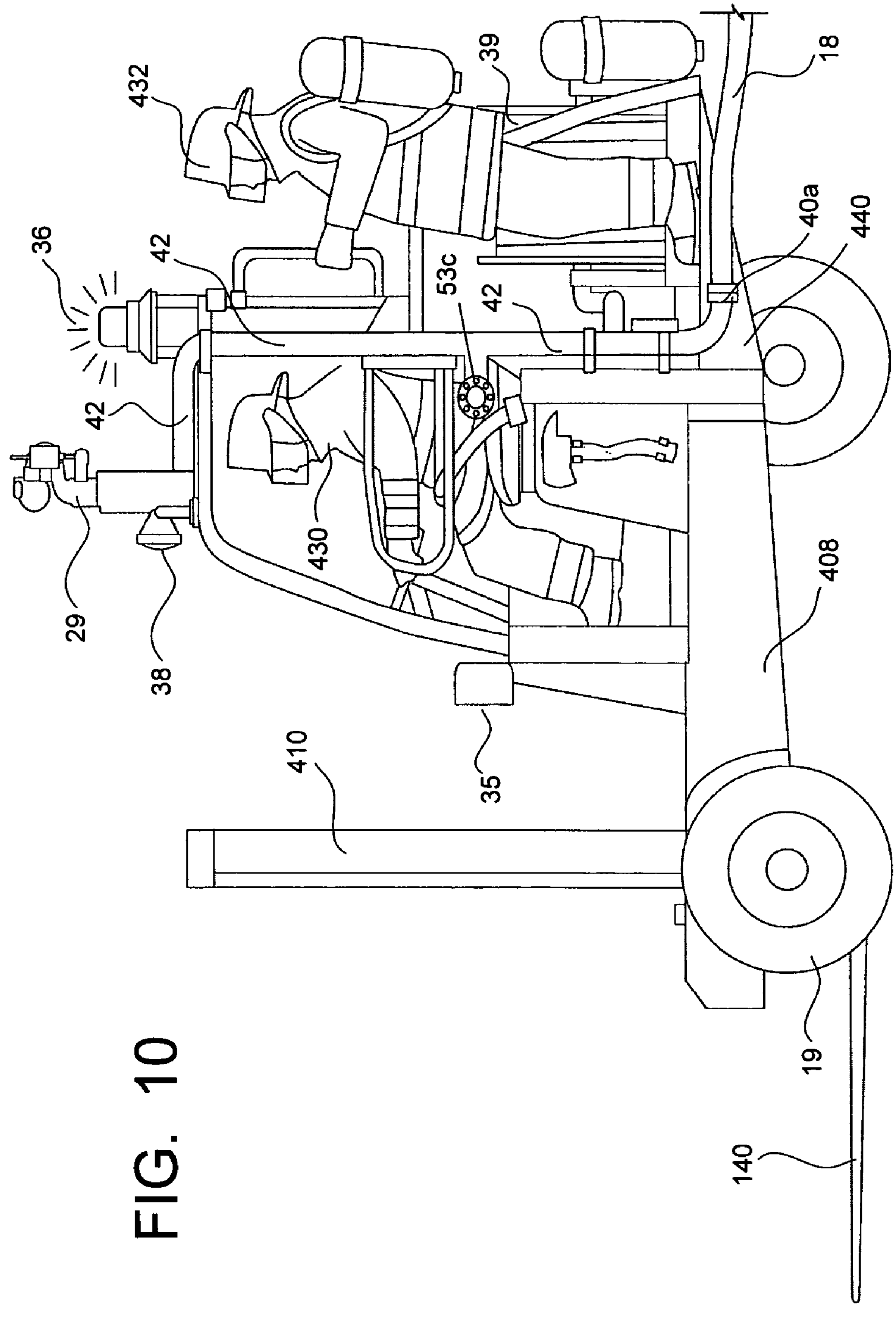
FIG. 10 depicts a side view illustration of the compact fire-fighting vehicle in accordance with this invention.
Figure 12:
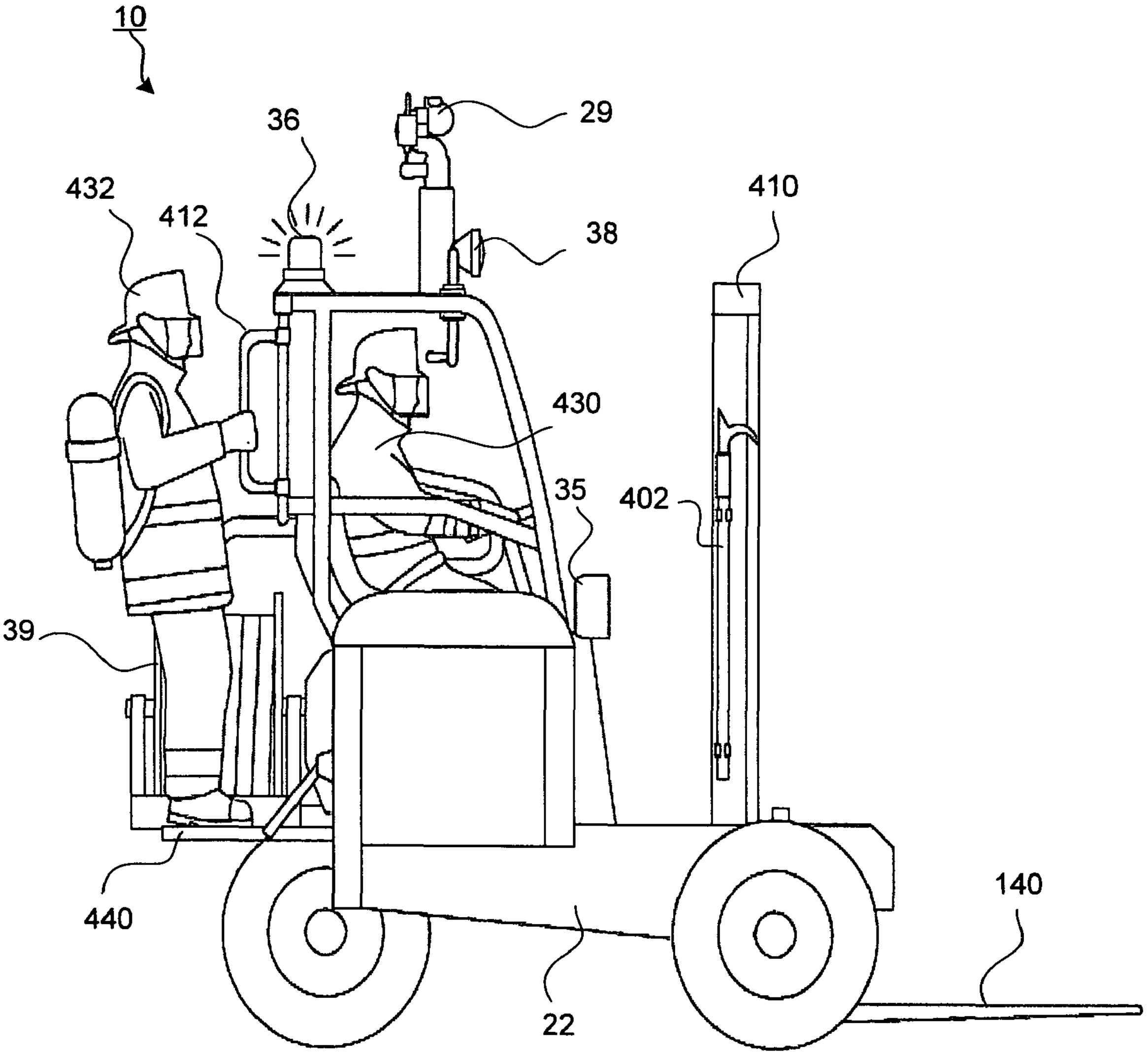
FIG. 12 depicts a right view illustration of the compact fire-fighting vehicle in accordance with this invention.

FIGS. 10, 3 and 12 illustrate exemplary left and right side views, respectively. In FIG. 10, the supply hose 18 is shown attached to the main intake inlet 40 and the fluid system includes plumbing pipes 42 which connect the main intake inlet 40 to the smaller intake inlet 40*a* and onward to the monitor 29 located on top of the drivers passenger compartment. The hose reel 39 is also shown attached at a lower end of the mobile fire attack vehicle 10.

Referring back to FIG. 3 which illustrates an exemplary right side view in which the monitor 29 is located on top of the fork lift guide rail 410 structure. Likewise, the fluid system 42 includes plumbing pipes which connect the main intake inlet 40 to the smaller intake inlet 40*a* and onward to the monitor 29 located on top of the fork lift guide rail 410 structure. This view is used to illustrate the fact that the monitor 29 and the hose reel 39 may be interchangeably located at various locations on the mobile fire attack vehicle 10.

FIG. 11 illustrates yet another exemplary illustration in which the mobile fire attack vehicle 10 includes a front mounted monitor 29 and a front mounted hose reel 39. In this embodiment, the mounting mechanism for mounting onto the fire truck 12 is not shown. It is understood that the mounting mechanism in accordance with this mobile fire attack vehicle 10 is variable and may incorporate any number of mounting mechanisms, even one in which the mounting mechanism is retractable and can be place out of view when viewing a side view such as in this illustration.

It should also be noted that the configuration of the mobile fire attack vehicle 10 and the component adapted for the mobile fire attack vehicle 10 are not intended to be limited to the particular embodiment which is shown and described herein, but is intended to cover all modifications and changes within the scope and spirit of the invention.

FIGS. 7 and 8 illustrate one exemplary method for mounting the mobile fire attack vehicle 10 to the rear end of a fire truck 12. Conventionally, a fire truck 12 carries a hose, water, rescue equipment and tools to fight a fire. However, never before has a fire truck 12, or any emergency response vehicle, carried a compact and portable fire attack vehicle 10 directly on the emergency response vehicle used to respond to fires as is shown described and shown in accordance with this invention.

The compact fire attack vehicle 10 may be portably mounted to the fire truck 12 in a plurality of different ways. An analogy can be drawn to the conventional mounting of a forklift truck to a semi trailer such as shown and described in U.S. Pat. No. 5,749,695, which is herein incorporated by reference in its entirety. Conventionally, the sole purpose of a forklift truck or vehicle mounted forklift has been exclusively used to allow a truck driver to load their vehicle, drive to a customer and unload their vehicle without the necessity to use anybody else's materials handling equipment. See, e.g., U.S. Pat. No. 5,749,695 and for a conventional forklift mounting, which is herein incorporated by reference in its entireity. As is evident in this application, the purpose, use, system, device and method in accordance with this invention is in stark contrast to the conventional art described above with respect to fork lifts.

Figure 13:
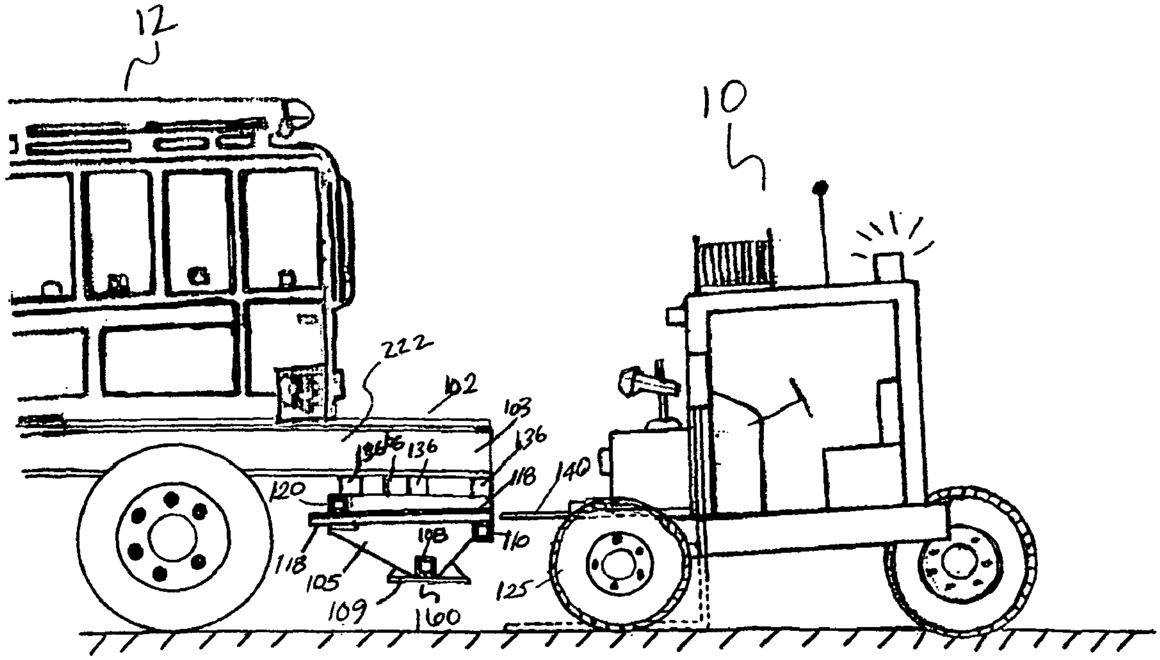
FIG. 13 depicts an exemplary illustration of the compact fire-fighting vehicle being mounted to the fire truck in accordance with this invention.
Figure 14:
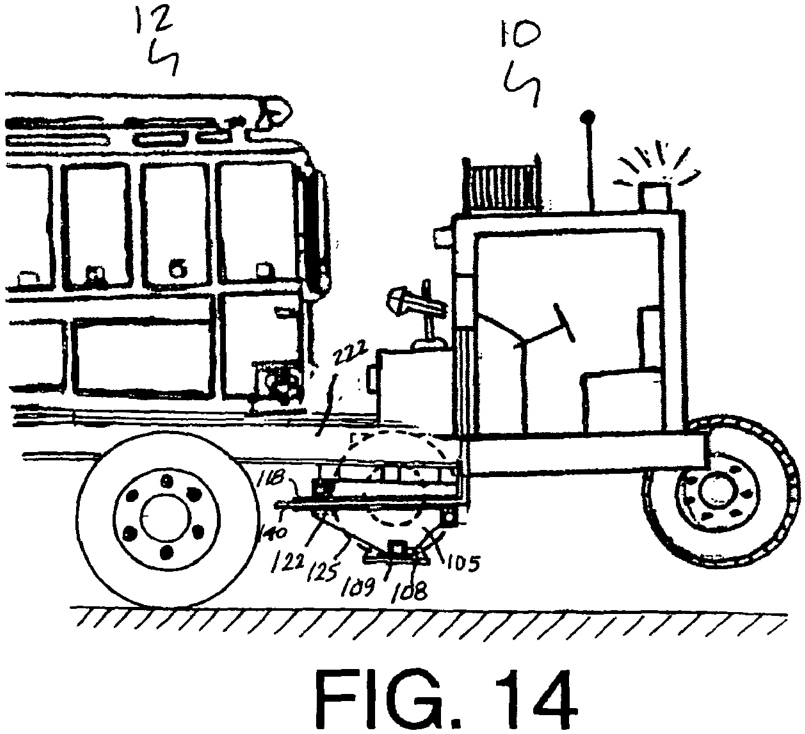
FIG. 14 depicts an exemplary illustration of the compact fire-fighting vehicle mounted to the fire truck in accordance with this invention.

FIGS. 13 and 14 depict the fire attack vehicle 10 mounted to an end of the fire truck 12 vehicle chassis 222. Although, in FIGS. 13 and 14, the lift mechanism is shown on the fire attack vehicle 10, in accordance with this invention, it is to be understood that the lift mechanism 60 may be disposed, either on the end of the fire truck 12 attached to its chassis 222 or on the fire attack vehicle 10 (as shown).

As shown in FIGS. 13 and 14, the fire truck 12 vehicle chassis 222 may be equipped with a reinforced composite base support framework. The mounting structure for the fire attack vehicle 10 may be configured based on the unique needs of the fire attack vehicle 10 and may borrow from conventional support mounting structures which are currently known for mounting a fork lift onto the rear end of a trailer.

In accordance with this invention, the fire attack vehicle 10 is provided for fighting a fire 13 and is mounted to the rear end of the fire truck 12. Significant improvements over conventional art are made as described herein to enable the fire truck 12 to receive and securely fasten the fire attack vehicle 10 to the rear end chassis 222 of the fire truck 12.

Since it is possible to construct the mobile fire attack vehicle 10 in a variety of different shapes and sizes, additional support to the fire truck 12 carrying a larger mobile fire attack vehicle 10 may be necessary. By way of example, it may be necessary to reinforce the chassis of the fire truck 12 to support the additional weight by a larger mobile fire attack vehicle 10. In many instances, a fire truck is constructed with a single rear axle. If the mobile fire attack vehicle 10 is sufficiently large, it may be necessary to reinforce the fire truck 12 with a tandem axle due to the additional weight of the mobile fire attack vehicle 10. Additional reinforcement may be made to the fire truck 12 to account for the additional weight of the mobile fire attack vehicle 10.

FIGS. 15-18 illustrate the employment of an exemplary mounting frame 100. Referring to FIG. 15, the mounting frame 100 includes a rear support beam 108 and a front support beam 120 interconnected by a pair of spaced-apart hanger plates 105. Each hanger plate 105 has a flanged upper end 106 that provides a laterally extending chassis engaging surface. A wheel rest plate 109 may be mounted at each end of the rear support beam 108. A pair of fork support sleeves 118, each for engagement with a fork of a forklift truck are mounted on the support framework between and substantially parallel to the hanger plates 105. A crash bar 110 is mounted at a rear end of the hanger plates 105.

In more detail, the mounting frame 100 may be secured at a rear end of the fire truck 12 and being suspended from longitudinal beams 130 on the chassis 222 of the fire truck 12. The mobile fire attack vehicle 10 is mountably engagable with the mounting frame 100 to mount the fire attack vehicle 10 on the fire truck 12 for transport.

The mounting frame 100 may include a composite prefabricated base support framework including a pair of spaced-apart substantially upright hanger plates 105 of generally triangular configuration with a substantially horizontal flange 106 at an upper end of each hanger plate 105. A front support beam 120 is mounted at a front end of the hanger plates 105 and a rear support beam 108 extends between a lower end of each hanger plate 105 and projects outwardly there from. A wheel rest plate 109 is mounted at each outer end of the support beam 108.

A crash bar 110 is mounted at a rear end of the hanger plates 105. Outer ends 111, 112 of the crash bar 110 are foldable between a stored position alongside the hanger plates 105 and an extended position in line with a central body portion 113 of the crash bar 110. Each outer portion 111, 112 may carry indicating and brake lamps 114 for the carrier vehicle 2.

A pair of spaced-apart fork support bars or sleeves 118 is mounted between the crash bar 110 and the front support beam 120 extending between the hanger plates 105 at a front end of the hanger plates 105. Wheel stops 122 associated with each wheel rest plate 109 are mounted adjacent each outer end of the front support beam 120. Thus as shown in FIG. 18 when a wheel 125 (shown in broken outline) of the fire attack vehicle 10 is seated on the wheel rest plate 109, a front end of the wheel 125 engages against the wheel stop 122.

FIG. 18 shows an exploded inverted view of the mounting frame 100. Hanger plates 105 are formed with slots 130,131, 132 for reception of the rear support beam 108, crash bar 110 and front support beam 120 respectively. The rear support beam 108 which is of box section material is inserted into the slots 130 and with the hanger plates 105 spaced-apart a preset desirable distance and in generally parallel alignment, the rear support beam 108 may be welded to the hanger plates 105.

The wheel rest plates 109 each have a sleeve 134 which slidably engages an outer end of the rear support beam 108. Thus, the spacing between the wheel rest plates 109 can be adjusted to a required distance and then the wheel rest plates 109 are fixed in position by welding. The crash bar 110 and front support beam 120 are inserted in their associated slots 131, 132 respectively and welded in position.

Each of the fork sleeves 118 is then mounted spaced-apart between the crash bar 110 and front support beam 120 and welded in position. It will be noted that the fork sleeves 118 may rest on a top surface of the crash bar 110 and engage an underside of the front support beam 120. The front support beam 120 in turn is located within cut-out slots at a front end of the hanger plates 105. This construction gives a strong and rigid structure which resists the tendency of the front ends of the fork sleeves 118 to lift due to the cantilevered effect of the fire attack vehicle 10 when raising the fire attack vehicle 10 on to the mounting frame 100.

In use, the mounting frame 100 is mounted on the chassis 222 at a rear end of the fire truck 12. Spacers 136 may be mounted between longitudinal beams 103 of the fire truck 12 and the flanges 106 of the hanger plates 105 for height adjustment of the mounting frame 100 on the fire truck 12 chassis. As shown in FIGS. 13 and 14, the fire attack vehicle 10 can engage its forks 140 in the sleeves 118 to raise the fire attack vehicle 10 and engage its front wheels 19 of the fire attack vehicle 10 with the wheel rest plates 109. Straps, chains or ties (not shown) are then engaged between the body of the fire attack vehicle 10 and lugs at a rear end of the fire truck 12 to secure the fire attack vehicle 10 in position carried on the wheel rest plates 109 held forwardly against the wheel stops 122. The fork controls can then be operated to take the weight of the fire attack vehicle 10 off the forks so that the mounting frame 100 carries the fire attack vehicle 10 through the wheel rest plates 109.

It will be appreciated that the mounting frame 100 can be readily easily prefabricated and then simply attached to a chassis at a rear end of the fire truck 12. Typically, the fire truck 12 has a chassis 222 including a pair of spaced-apart longitudinal beams, and the spacing between the beams may vary between different sizes and constructions of vehicle. The flanged upper end of the hanger plates accommodates a range of sizes and the hanger plates may be mounted directly onto the beams on the fire truck 12 or spacers or mounting brackets may be provided to attach the upper end of the hanger plates to the longitudinal beams of the fire truck 12 chassis 22.

Figure 19:
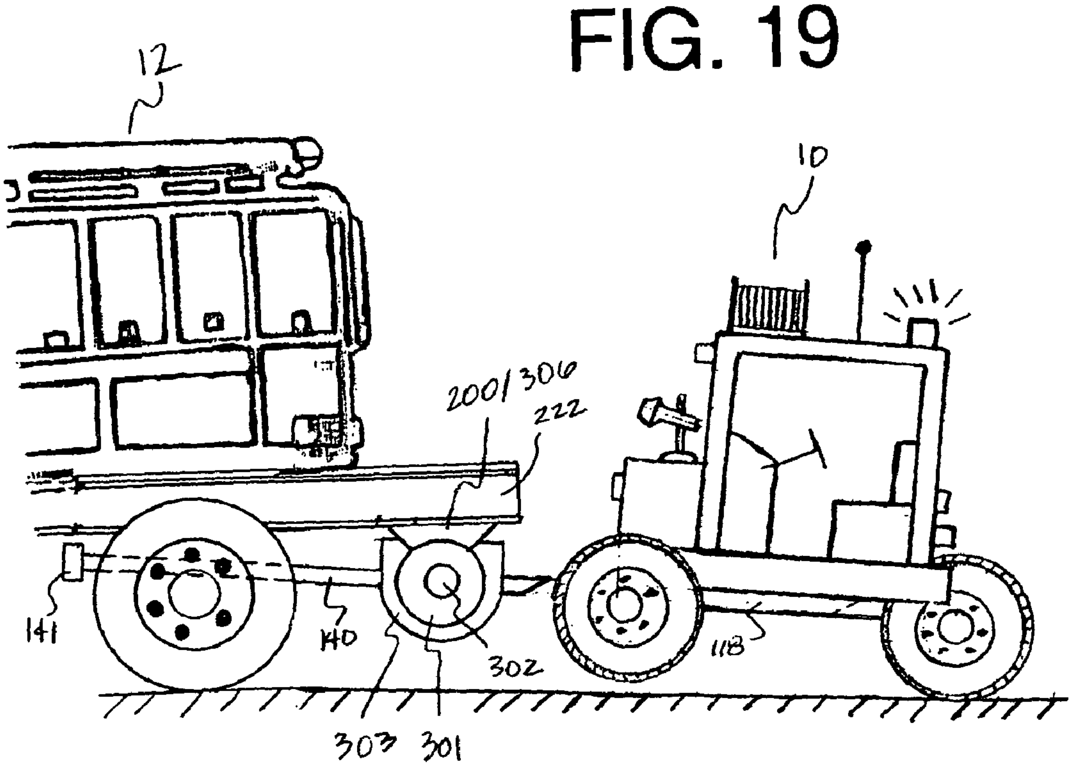
FIG. 19 depicts another exemplary illustration of the compact fire-fighting vehicle being mounted to the fire truck in accordance with this invention.
Figure 20:
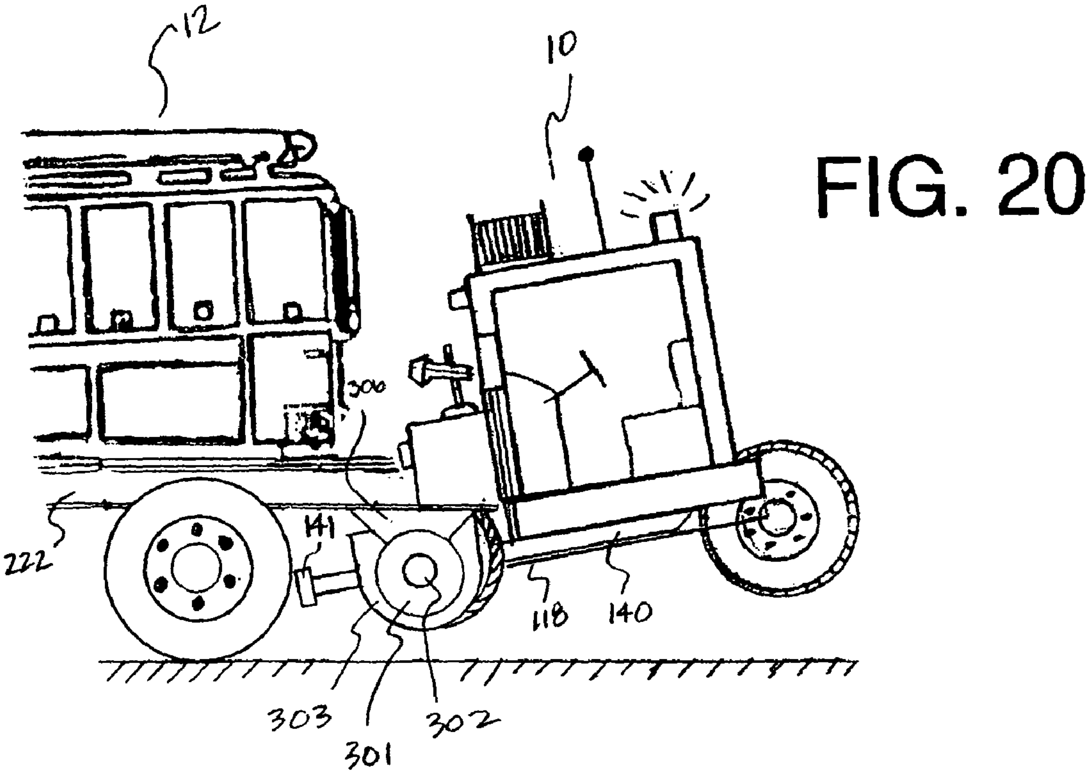
FIG. 20 depicts an exemplary illustration of the compact fire-fighting vehicle mounted to the fire truck in accordance with this invention.

FIGS. 19 and 20 illustrate another exemplary mounting frame 200. This exemplary mounting frame 200 is provided to illustrate that the lifting mechanism may be disposed as part of the mounting frame 200. In more detail, the mounting frame 200 includes a support bracket 306 on to which the mounting frame 200 may be supported to the chassis 222 of the fire truck 12. A turret 301 is adapted for use and attached to the support bracket 306. The turret 301 is rotatable about a central flange connection 302.

The turret 301 may be rotated under the control of a variety of different power mechanisms. For example, the turret 301 may be rotated by manual, hydraulic, electrical, mechanical means and/or any other means for rotating the turret 301.

The mounting frame 200 further includes a pair of spaced apart fork support flanges 303. The fork support flanges 303 receive and support the forks 140 disposed there through. As shown in FIG. 19, when it is time to mount the fire attack vehicle 10 back onto the mounting frame 200, the sleeves 118 on the fire attack vehicle 10 are aligned with the forks 140 on the mounting frame 200. When the fire attack vehicle 10 has been aligned, the forks 140 are extended no further than the ends 141 of the forks 140. The forks 140 are received by the sleeves 118 of the fire attack vehicle 10. The forks 140 are then locked into place in the sleeves 118 and a secure connection is made between the fire attack vehicle 10 and the mounting frame 200.

FIG. 20 depicts the lifting feature of the mounting frame 200. After the secure connection is made between the fire attack vehicle and the mounting frame 200, the turret 301 is rotated counter clockwise and the fire attack vehicle is lifted from the ground into a compact storage position adjacent to the rear end of the fire truck 12. The fork controls of the mounting frame 200 are operated in any conventional manner.

The fire attack vehicle 10 can then be secured in the mounted position. The fire attack vehicle may be fastened in a variety of different ways, such as for example, with by a strap, a chain (not shown), a pin connection (not shown) and/or any other method for fastening the fire attack vehicle in the mounted position in accordance with this invention.

Various features described above with respect to the mounting frame 100 shown in FIGS. 13 and 14 may be employed in accordance with this exemplary embodiment. For example, the system for mounting the fire attack vehicle shown in FIGS. 19 and 20 may include additional component parts, such as a wheel rest plates, and the like. It is to be understood that this exemplary embodiment is not intended to be limited and may be modified in accordance with this invention.

Figure 21:
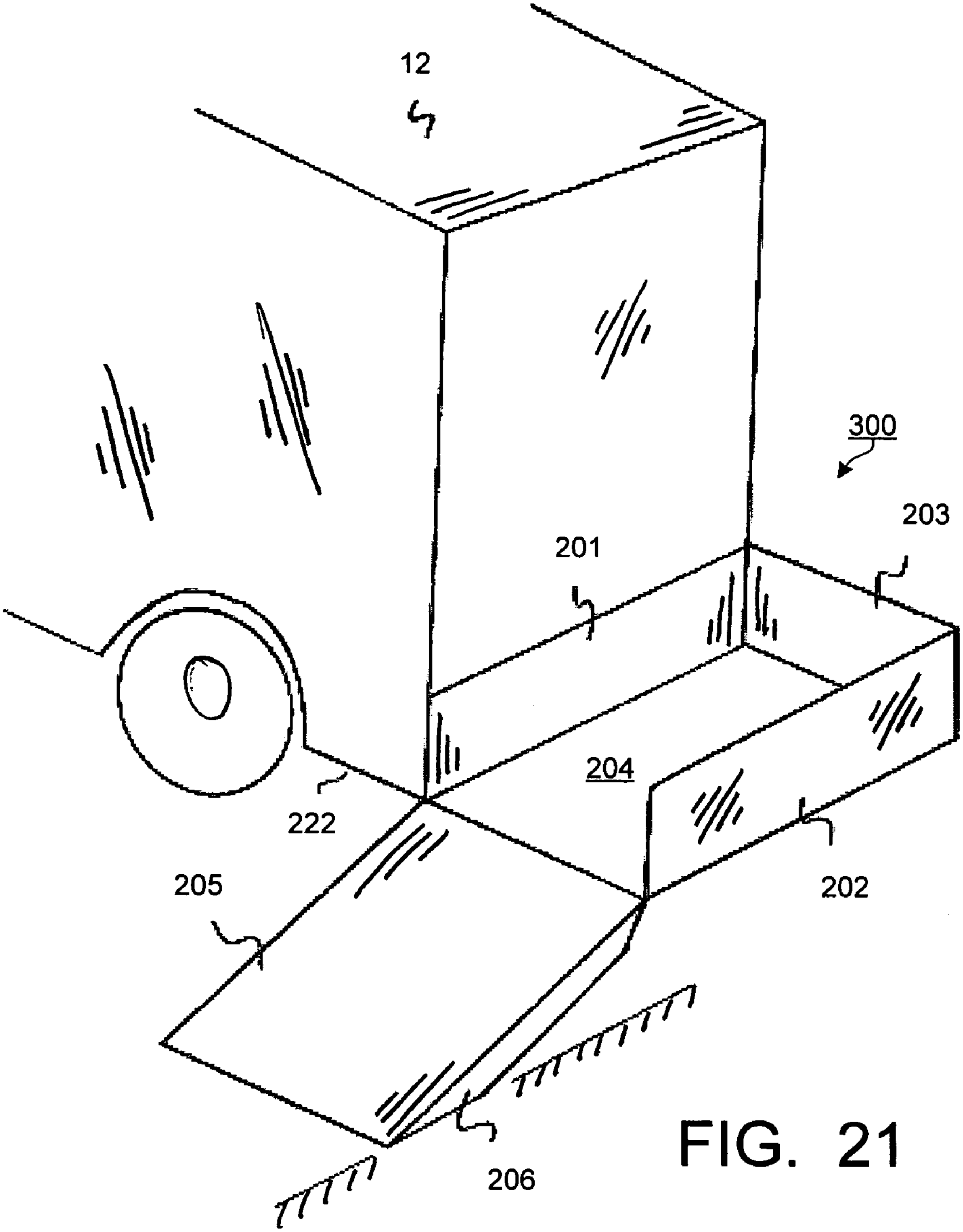
FIG. 21 depicts an exemplary illustration of another alternative mounting means for securing the compact fire-fighting vehicle to the fire truck in accordance with this invention.

FIG. 21 illustrates another exemplary mounting frame 300 for mounting the fire attack vehicle 10 to an end of the fire truck 12 vehicle chassis 222. In accordance with this embodiment, the fire truck 12 may be fitted with the mounting frame 300 for carrying the fire attack vehicle 10. In FIG. 15, the mounting frame 300 is configured as a shallow open top box including a first panel 201 adjacent to the rear end of the fire truck 12, a second panel 202 opposite the first panel 201, a rear end panel 203 and a bottom panel 204 provided to support the fire attack vehicle 10. The mounting frame 300 includes a ramp panel 205 which is configured as a ramp having ramp supports 206. The fire attack vehicle 10 can be loaded and unloaded via the ramp panel 205. The ramp panel 205 is retractable so that the fire attack vehicle 10 can be loaded and unloaded onto the mounting frame 300.

In operation, the retractable ramp panel 205 is unlocked and lowered to the ground. The fire attack vehicle 10 is then allowed to drive off of the ramp panel 205 over to a remote area in which the structural fire is ablaze. When the use and operation of the fire attack vehicle 10 has been completed, the fire attack vehicle 10 can be driven back up the ramp panel 205 onto the mounting frame 300 and secured in position for travel.

The various exemplary embodiments shown and described herein are provided to illustrate and describe additional exemplary features and functionality in accordance with this invention. The illustrations and examples provided herein are for explanatory purposes and are not intended to limit the scope of this invention. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. An emergency response vehicle, in combination with, and mountable on a land driven transport vehicle, comprising:

a mounting mechanism comprising a pair of forks, extending from the emergency response vehicle, adapted to detachably mount the emergency response vehicle onto the transport vehicle, wherein during transit the emergency response vehicle is mounted in a suspended position by the forks, and extending beyond a rear end of the transport vehicle such that no portion of the emergency response vehicle contacts the ground during transport and wherein at the arrival of a scene of an emergency, the emergency response vehicle can be quickly lowered back onto the ground, and disengaged from the transport vehicle in order to respond to the emergency; and a fluid system plumbed throughout the emergency response vehicle comprising an inlet and a discharge outlet adapted to deliver a pressurized source of a fire extinguishing material onto a fire.

2. The emergency response vehicle recited in claim 1, wherein the inlet is adapted to establish a fluid connection to, and receive, the fire extinguishing material from at least one of a fire vehicle and a water hydrant.

3. The emergency response vehicle recited in claim 1, wherein the discharge outlet is coupled to a monitor adapted to concentrate the delivery of the pressurized fire extinguishing material onto a fire at a predetermined location.

4. The emergency response vehicle recited in claim 1, wherein the discharge outlet is coupled to a hose that can be extended from the emergency response vehicle to a location adjacent to a fire.

5. The emergency response vehicle recited in claim 1, wherein the hose is stored and located on the emergency response vehicle in at least one of the following locations:

wound on a hose reel and stored within a hose box compartment.

6. The emergency response vehicle recited in claim 1, wherein the fire extinguishing material is chosen from at least one of: water, a foam, a chemical fire retardant material and a mixture of fire retardant materials.

7. The emergency response vehicle recited in claim 1, further including at least one of the following emergency response tools: an illumination light, an axe, a pike pole, a trash hook, a ladder, a rescue basket, a dry wall hook pike pole, a hooligan bar, a rescue equipment item and a breaking material item.

8. The emergency response vehicle recited in claim 1, wherein a rescue basket is adapted to be carried and secured to the forks of the emergency response vehicle.

9. The emergency response vehicle recited in claim 1, wherein the emergency response vehicle is adapted to carry rescue personnel.

10. The emergency response vehicle recited in claim 1, wherein the emergency response vehicle further includes at least one of a radio communications device, a remote control mechanism, a thermal imaging device and an infrared (IR) monitoring device.

11. The emergency response vehicle recited in claim 1, wherein the emergency response vehicle further comprises a seat adapted to support a self contained breathing apparatus pack (SCBA).

12. The emergency response vehicle recited in claim 1, wherein the forks are adapted to be retractably and slidably received within a pair of spaced apart fork support sleeves disposed within a body of the emergency response vehicle so that when the emergency response vehicle is in use, the forks can be retracted out of the way and back into the sleeves.

13. The emergency response vehicle recited in claim 1, wherein:

the intake inlet is comprised of a first large intake inlet and at least one smaller intake inlet which merges into a single plumbed pipe which is connected to a split pipe; and the split pipe including at least a first branch pipe which feeds into a monitor and a second branch pipe which feeds into a hose.

14. The emergency response vehicle recited in claim 1, wherein an additive mixer is disposed within the fluid system to provide a fire retardant mixture material to be delivered to the fire.

15. The emergency response vehicle recited in claim 1, wherein the weight of the emergency response vehicle is mounted in the suspended position when the forks extruding from the emergency response vehicle are received in a mounting frame disposed on the transport vehicle.

16. The emergency response vehicle recited in claim 15, wherein the emergency response vehicle is in the suspended position from the ground when the forks disposed on the emergency response vehicle are lifted by a turret mounting device disposed on the transport vehicle.

17. An emergency response vehicle, in combination with, and mountable on a land driven transport vehicle, comprising:

a pair of forks extending from the emergency response vehicle, and adapted to detachably mount the emergency response vehicle onto a transport emergency response vehicle, wherein during transit the emergency response vehicle is mounted in a suspended position by the forks, and extending beyond a rear end of, and carried by the transport emergency response vehicle such that no portion of the emergency response vehicle contacts the ground during transport, and wherein at the arrival of a scene of an emergency, the emergency response vehicle can be lowered back onto the ground and disengaged from the transport emergency response vehicle in order to quickly respond to the emergency; and a fluid system plumbed throughout the emergency response vehicle comprising:

an inlet to receive a pressurized fire extinguishing material; and a discharge outlet adapted to deliver the pressurized fire extinguishing material onto a fire from at least one of a hose and a monitor.

18. A method for responding to a fire, where in combination with, an emergency response vehicle is mountable to a land driven transport vehicle in a completely suspended position above the ground by forks extending from the emergency response vehicle, the emergency response vehicle extending beyond a rear end of the land driven transport vehicle, comprising:

transporting the emergency response vehicle in the suspended position to a vicinity of the fire such that no portion of the emergency response vehicle contacts the ground during transport;

lowering the emergency response vehicle onto the ground and detaching the emergency response vehicle from the transport vehicle;

connecting a first hose that supplies a pressurized fire extinguishing material from the transport vehicle to the emergency response vehicle;

driving the emergency response vehicle from the location of the transport vehicle to a location adjacent to the fire; and extending a second hose from the emergency response vehicle to a location adjacent to the fire; and delivering the fire extinguishing material directly to the fire.

19. The method recited in claim 18, further comprising wherein the first hose that supplies a pressurized fire extinguishing material to the emergency response vehicle is fluidly connected to a water hydrant.

* * * * *